(12) United States Patent
Martin

(10) Patent No.: US 8,293,812 B2
(45) Date of Patent: Oct. 23, 2012

(54) POLYMER COMPOSITE

(75) Inventor: Darren James Martin, St. Lucia (AU)

(73) Assignee: The University of Queensland St. Lucia (AU)

( * ) Notice: Subject to any disclaimer, the term of this patent is extended or adjusted under 35 U.S.C. 154(b) by 631 days.

(21) Appl. No.: 11/575,750

(22) PCT Filed: May 19, 2005

(86) PCT No.: PCT/AU2005/000718
§ 371 (c)(1),
(2), (4) Date: Jun. 22, 2007

(87) PCT Pub. No.: WO2006/024068
PCT Pub. Date: Mar. 9, 2006

(65) Prior Publication Data
US 2008/0281016 A1 Nov. 13, 2008

(30) Foreign Application Priority Data

Aug. 30, 2004 (AU) .................. 2004904919

(51) Int. Cl.
*A61F 2/00* (2006.01)
*C08G 69/26* (2006.01)
*C08K 3/34* (2006.01)

(52) U.S. Cl. ................ 523/113; 524/445; 524/606

(58) Field of Classification Search .............. 523/113; 524/442, 444, 449
See application file for complete search history.

(56) References Cited

U.S. PATENT DOCUMENTS

| | | | |
|---|---|---|---|
| 3,915,735 A | 10/1975 | Moreland | |
| 5,385,776 A | 1/1995 | Maxfield et al. | |
| 5,393,858 A | 2/1995 | Meijs et al. | |
| 5,520,998 A | 5/1996 | Uemoto et al. | |
| 5,747,560 A | 5/1998 | Christiani et al. | |
| 5,891,611 A | 4/1999 | Majumdar et al. | |
| 5,981,126 A | 11/1999 | Majumdar et al. | |
| 6,313,254 B1 | 11/2001 | Meijs et al. | |
| 6,420,452 B1 | 7/2002 | Gunatillake et al. | |
| 6,437,073 B1 | 8/2002 | Gunatillake et al. | |
| 6,653,388 B1 * | 11/2003 | Barbee et al. ............ | 524/445 |
| 6,674,009 B2 | 1/2004 | Fomperie et al. | |
| 6,858,680 B2 | 2/2005 | Gunatillake et al. | |
| 2002/0189941 A1 * | 12/2002 | Katsuki et al. ........... | 204/403.01 |
| 2003/0100656 A1 * | 5/2003 | Majumdar et al. ......... | 524/445 |
| 2004/0052957 A1 * | 3/2004 | Cramer et al. ............ | 427/421 |

FOREIGN PATENT DOCUMENTS

| | | |
|---|---|---|
| WO | 92/00338 | 1/1992 |
| WO | 93/11190 | 6/1993 |
| WO | 98/13405 | 4/1998 |
| WO | 98/54242 | 12/1998 |
| WO | 99/03863 | 1/1999 |
| WO | 99/50327 | 10/1999 |
| WO | 00/64971 | 11/2000 |
| WO | 01/07499 | 2/2001 |

OTHER PUBLICATIONS

Tien Y.I., Wei K. H. "Hydrogen bonding and mechanical properties in segmented montmorillonite/polyurethane nanocomposites of different hard segment ratios" Aug. 10, 2000, Polymer (42), p. 3213-3221.*

Pannirselvam, et al. "Oxygen barrier property of polypropylene-polyether treated clay nanocomposite" eXPRESS Polymer Letters vol. 2, No. 6 (2008) 429-439.*

Tien, Y.I., et al "Hydrogen Bonding and mechanical properties in segmented montmorillonite/polyurethane nanocomposites of different hard segment ratios", *Polymer*, 42(7), p. 3213-3221, Mar. 2001.

Moon, S.-Y. et al. "Polyurethane/montmorillonite nanocomposites prepared from crystalline polyois, using 1,4-butanediol and organoclay hybrid as chain extenders", European Polymer Journal, 40(8), p. 1615-1621, Aug. 2004.

Choi et al., "Synthesis of chain extended organifier and properties of polyurethane/clay nanocomposites", Polymer, 45(17), p. 6045-6057, Aug. 5, 2004.

Xu, R. "Low permeability biomedical polyuzethane nanocomposites", J Biomedical Materials Research, 64A(1), p. 114-119, Jan. 1, 2003.

Xu, R., "New Biomedical Polyurethane urea)-Layered Silicate Nanocomposites", Macromolecules, 34, p. 337-339, Jan. 16, 2001.

Pattanayak, A., "Properties of bulk-polymerized thermoplastic polyurethane nanocomposites", Polymer, 46(10), 394-3406, Apr. 5, 2005.

Bai, N. et al., "The effect of artificial clay on compatibilization of polymer blends" [Online] Jul. 2003 (Retrieved on Jun. 8, 2005) http://web.archive.org/web/20030711015449/http://polymer.matscieng.sunyab.edu/abstracts_2001.pdf.

Chen, T.-K. et al., "Synthesis and characterization of novel segmented polyurethane/clay nanocomposites" Polymer, 41(4), p. 1345-1353, (2000).

Fornes, T.D. "Modeling properties of nanocomposites using composite theories", Polymer 44(2003) 4993-5013.

Bergaya, et al., "Surface modification of clay minerals", Applied Clay Science 19, (2001) 1-3.

(Continued)

*Primary Examiner* — Peter F Godenschwager
(74) *Attorney, Agent, or Firm* — Woodcock Washburn LLP

(57) ABSTRACT

The invention provides a polymer composite comprising a thermoplastic host polymer having solid particulate material dispersed therethrough, the host polymer having at least one phase nanodomain, wherein the solid particulate material comprises particles having height, length and width dimensions of which at least one is substantially less than one or both of the other dimensions, and wherein the composite exhibits an increase in modulus of no more than 15% and a higher tensile strength, relative to said host polymer.

29 Claims, 1 Drawing Sheet

OTHER PUBLICATIONS

Fan, et al. Intercalation of polymerization initiators into montmorillonite nanoparticle platelets: free radicals vs. anionic initiator clays, (2003).

Ray, et al. "characterization of electron-beam-modified surface coated clay fillers and their influence on physical properties of rubber", Radiation and Physics Chemistry 65 (2002) 627-640.

* cited by examiner

POLYMER COMPOSITE

CROSS-REFERENCE TO RELATED APPLICATIONS

This application is the National Stage of International Application No. PCT/AU2005/000718, filed 19 May 2005, which claims the benefit of Australian Application No. 2004904919, filed 30 Aug. 2004, the disclosures of which are incorporated herein by reference in their entirety.

FIELD OF THE INVENTION

The present invention relates to a polymer composite comprises a thermoplastic host polymer having a solid particulate material dispersed therethrough.

BACKGROUND OF THE INVENTION

Products traditionally manufactured from glass, wood, ceramic or metal are increasingly being manufactured from polymer materials. Polymers are particularly versatile as a construction material due to the relative ease with which they can be formed into either simple or complex shapes.

An important factor in selecting a polymer as a substitute material for making an existing product, or as a material for making a new product, is to ensure that the polymer has the requisite chemical and/or physical properties to enable the product to adequately perform its intended function. To a large extent, the chemical and/or physical properties of a polymer are determined by its molecular structure. Such properties can, however, also be influenced by the dispersion of reinforcing additives, such as solid particulate material, throughout the polymer matrix to form a composite structure.

A polymer composite can often exhibit enhanced chemical and/or physical properties compared with those properties exhibited by the host polymer in the absence of the solid particulate material. For this reason, polymer composites are used extensively to manufacture products across a diverse array of industries, including the aeronautical, automotive and biomedical industries, to name but a few.

A rapidly developing field of polymer composite technology is that of polymer nanocomposites. Polymer nanocomposites are typically prepared by dispersing clusters, layers, rods or networks of nanometer sized ($10^{-9}$ to $<10^{-6}$ m) materials throughout a host polymer matrix. Such composites can exhibit enhanced chemical and/or physical properties compared with a corresponding polymer micro-composite, or the host polymer absent any reinforcing particles, and these enhanced properties can often be attained using a relatively small amount of nanoparticle additive.

Despite the advantages offered by known polymer composites, there is an ever-present demand for materials having superior properties. Accordingly, there remains an opportunity to develop polymer composites for use as construction materials which present new and/or improved chemical and/or physical properties.

SUMMARY OF THE INVENTION

According to a first aspect, the invention provides a polymer composite comprising a thermoplastic host polymer having solid particulate material dispersed therethrough, the host polymer having at least one phase nanodomain, wherein the solid particulate material comprises particles having height, length and width dimensions of which at least one is substantially less than one or both of the other dimensions, and wherein the composite exhibits an increase in modulus of no more than 15%, an increase in hysteresis of no more than 40%, and a higher tensile strength, relative to the host polymer.

Polymers having a phase nanodomain are generally known, and include for example segmented polyurethane. Such polymers have been shown to exhibit advantageous properties in that the phase nanodomains can function as pseudo reinforcing particulate material to promote a degree of composite character to the polymer, and/or they can function as a physical crosslink to promote a degree of elastomeric character to the polymer. The incorporation of nanosized particulate material into polymers having a phase nanodomain to provide polymer nanocomposites has been reported. Such polymer nanocomposites have to date been generally prepared using nanoparticles having at least one relatively large (ca>100 nanometers (nm)) average dimension, or substantially isometric nanoparticles (eg spherical nanoparticles).

Without wishing to be limited by theory, it is believed that a polymer composite in accordance with the invention derives its unique properties through the presence of dispersed relatively small anisometric nanoparticles. The improved properties of the composite are believed to stem from a unique interrelationship between the morphology of the host polymer and small nanoparticles dispersed therethrough. In particular, when the polymer composite is subjected to an elongational force it is believed that the relatively small dimensional size, and hence increased mobility, of these nanoparticles, coupled with their anisometric dimensional attributes, enables both the small nanoparticles and the polymer chains of the host polymer to align themselves more efficiently in the direction of the applied force. The efficient manner in which the small nanoparticles co-align with the polymer chains is believed to increase secondary bonding and/or physical entanglements between the phase nanodomain(s), the small nanoparticles, and any other phase domain(s) present, to thereby reduce slippage of the chains during straining. The net effect of this is believed to manifest itself in at least an increase in tensile strength of the composite. In other words, a more effective load transfer from the polymer matrix to the small nanoparticles under a shear regime is believed to occur as a result of the particles being aligned more effectively.

To date it has been generally accepted in the art that the stiffness or modulus of a host polymer will increase significantly when particulate material is dispersed therethrough. This increase in modulus is believed to result from the mismatch in the elastic constants of the particulate material and the host polymer. In particular, polymer in the vicinity of the particulate material may become mechanically restrained by particulate material, thereby enabling a significant proportion of an applied load to be transferred to the particulate material. The net effect of this is an increase in the modulus of the polymer. In some applications for polymer composites, it may be desirable that the polymer exhibits a degree of increased stiffness. However, there are many applications where it is desirable for a polymer composite to exhibit improved tensile strength without a significant increase in stiffness. This will generally be the case where a product requires both good flexibility and good tensile strength in operation. It is, however, generally difficult to provide a polymer composite that exhibits improved tensile strength without a significant increase in stiffness.

In addition to exhibiting an increase in tensile strength, a polymer composite in accordance with the first aspect of the invention will also advantageously exhibit an increase in modulus or stiffness of less than about 15%, relative to the modulus of the host polymer.

The polymer composite preferably exhibits an increase in modulus of no more than 10%, more preferably no more than 5%, most preferably no more than 3%, relative to the modulus of the host polymer as measured by a standard tensile test using an Instron or similar instrument and calculating the Young's modulus in a standard manner.

Without wishing to be limited by theory, it is believed that despite providing for increased polymer chain/particle interaction, the relatively small nanoparticles enable the polymer chains to retain a comparable degree of flexibility under an applied load compared with the host polymer absent the particles. In particular, polymer in the vicinity of the small nanoparticles does not appear to undergo a large degree of mechanical restraint at low strains, which in turn minimises the proportion of load which can be transferred to them. Accordingly, upon being subjected to an applied load, the polymer chains in the polymer composite are believed to have a similar flexibility and hence modulus as that in the host polymer per se.

In contrast, a polymer composite formed from the same host polymer having relatively large particles or particles having isometric dimensions dispersed therethrough is less likely to exhibit efficient co-alignment of the polymer chains and the particles when the composite is subjected to an elongational force. In particular, not only are the larger particles more hindered from aligning due to their increased bulk, but their large size can also spatially confine the phase nanodomain(s) to thereby inhibit polymer chains within the confined environment from aligning. One effect of this confinement can be to cause the particles to act as "stress raisers", which can in turn ultimately lead to the formation of internal voids within the composite, reduced polymer/particle interaction, and reduced physical and mechanical properties of the composite. As for the isometric particles, not only do they have less or no capacity to align, their low aspect ratio provides for minimal polymer/particle interaction. As a result of this reduced level of interaction between the polymer chains and the particles during deformation, such a polymer composite is likely to exhibit at least a lower tensile strength compared with that of the polymer composite in accordance with the invention.

Having said this, it will be appreciated that polymer composites comprising relatively large particles and/or substantially isometric particles can exhibit an increase in tensile strength relative to the host polymer per se. However, in such cases, the degree to which the tensile strength can be increased will generally be less than that which can be attained with polymer composites in accordance with the invention. Furthermore, polymer composites comprising relatively large particles and/or substantially isometric particles will also typically exhibit a significant increase in stiffness accompanying any increase in tensile strength, relative to the host polymer. Polymer composites in accordance with the invention can exhibit a relatively low increase in stiffness accompanying an increase in tensile strength.

Those skilled in the art will appreciate that particulate materials will often be made up of particles having a shape and size distribution rather than particles of a uniform shape and size. A polymer composite in accordance with the invention may therefore comprise some large particles and/or some substantially isometric particles together with the relatively small anisometric nanoparticles.

It has now been found that by increasing the proportion of dispersed small anisometric nanoparticles relative to dispersed large particles and/or substantially isometric particles in a polymer composite, the tensile strength of the composite may be increased relative the composite with the large particles and/or substantially isometric particles alone, and an increase in modulus can be minimised relative to the modulus of the host polymer per se.

To afford the advantages of the invention, the proportion of small anisometric nanoparticles, relative to large and/or substantially isometric particles, required for a given composite can vary depending upon the nature of the host polymer and the particulate material. However, the advantages of the invention will generally be observed when the proportion of small anisometric nanoparticles is equal to or greater than the proportion of large and/or substantially isometric particles. The small anisometric nanoparticles will generally have height, length and width dimensions which are all about 50 nanometers or less.

It can be convenient to consider the required proportion of the relatively small anisometric nanoparticles on a weight percent basis.

Accordingly, in a second aspect the present invention provides a polymer composite comprising a thermoplastic host polymer having solid particulate material dispersed therethrough, the host polymer having at least one phase nanodomain, wherein the solid particulate material comprises particles of which at least about 50 wt % have height, length and width dimensions which are all about 50 nanometers or less, wherein at least one of the dimensions of said at least about 50 wt % of the particles is substantially less than one or both of the other dimensions and wherein the composite exhibits a higher tensile strength relative to said host polymer.

As discussed below, in some instances it may be more convenient to consider the number of particles, rather than their weight percent.

Accordingly, in a third aspect the present invention provides a polymer composite comprising a thermoplastic host polymer having solid particulate material dispersed therethrough, the host polymer having at least one phase nanodomain, wherein the solid particulate material comprises particles of which at least about 50% by number have height, length and width dimensions which are all about 50 nanometers or less, wherein at least one of the dimensions of said at least about 50% by number of the particles is substantially less than one or both of the other dimensions and wherein the composite exhibits a higher tensile strength relative to said host polymer.

BRIEF DESCRIPTION OF THE DRAWINGS

Embodiments of the invention will hereinafter be described with reference to the following non-limiting drawings in which.

DETAILED DESCRIPTION OF THE INVENTION

Figure 1:
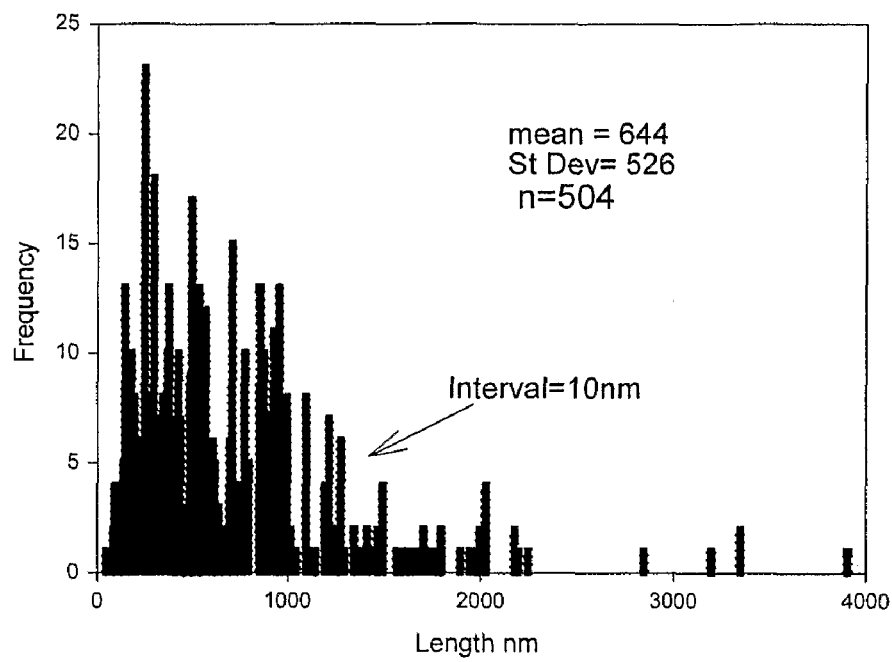
FIG. 1 is a histogram representing the dispersed particle size distribution in comparative example TPU-U, as determined using the method employed by Formes and Paul[1].

A polymer composite in accordance with the invention comprises a thermoplastic host polymer having at least one phase nanodomain. As a "host" polymer, the polymer serves to accommodate solid particulate material dispersed throughout its polymeric matrix. The polymer composite may comprise one or more other different polymers, but it is preferable that the host polymer represents at least 50 wt %, more preferably at least 75 wt % and most preferably 100 wt % of the total polymer content of the polymer composite.

In the case where the polymer composite comprises one or more other different polymers, such polymers may exhibit thermoplastic or thermoset properties. Suitable thermoplastic polymers include, but are not limited to, poly(acrylic acid), poly(butyl methacrylate), polycarbonate, poly(dimethylsiloxane), poly(ethylene oxide), poly(ethylene propylene), poly(ethyl vinyl acetate), poly(methyl methacrylate), polystyrene, poly(vinyl acetate), poly(vinyl methyl ether), poly(vinyl pyrolidone), poly(dimethyl diallyl ammonium chloride), polyethylene, polypropylene, polyimide, poly(vinyl methyl ether), poly(propylene carbonate), and combinations thereof. Suitable thermoset polymers include, but are not limited to, those derived from unsaturated polyester resins, epoxy resins, natural or synthetic rubber, and combinations thereof.

The one or more other different polymers may also have the solid particulate material dispersed throughout their polymeric matrix.

By the host polymer having at least one "phase nanodomain" is meant that the host polymer includes, as part of the polymer, a domain that has at least one dimension of nanoscopic size ($10^{-9}$ to $<10^{-6}$ m) and is substantially uniform in chemical composition and physical state. Those skilled in the art will appreciate that such a domain in effect represents a section or portion of the molecular chain structure of the host polymer, and that the domain may be present as a continuous or discontinuous phase. By having at least one phase nanodomain, the host polymer inherently must provide for at least one other phase domain. The at least one other phase domain may present as a continuous or discontinuous phase domain, and may also itself be a phase nanodomain.

A phase nanodomain polymer morphology is typically provided by block, graft, or segmented copolymers. The phase nanodomains can be either hard or soft in nature. By being "hard" it is meant that the domains have a glass transition temperature ($T_g$) that is higher than the temperature at which the polymer is to be used. By being "soft" it is meant that the domains have a $T_g$ that is lower then the temperature at which the polymer is to be used. For avoidance of any doubt, reference to "hard domains" and "soft domains" herein will be the state of those domains at 25° C.

The host polymer used in accordance with the invention may provide for various combinations of hard/soft and continuous/discontinuous phase domains. For example, the host polymer may provide for a co-continuous morphology whereby hard and soft phase nanodomains both exist as continuous phases. Preferably, the host polymer in accordance with the invention provides for a soft continuous phase nanodomain and a hard discontinuous phase nanodomain.

Although by definition a phase nanodomain only requires at least one dimension which ranges from about 1 nm to less than 1000 nm, the phase nanodomain(s) of the host polymer will typically have at least one dimension that ranges from about 1 nm to about 100 nm. Preferably, the phase nanodomain(s) will have at least one dimension that ranges from about 1 nm to about 40 nm, more preferably from about 2-5 nm to about 20 nm.

Suitable host polymers that may provide for a phase nanodomain include, but are not limited to, polyurethane, polyurea, polyurethaneurea, polyesteramide, polyetheramide, ethylene propylene random copolymer, polycaprolactone-etheramide, polyimide, polyurethane-imide, polyetherimide, polyetherester, polyesterurethane, poly(ethylene terephthalate)-poly(ethylene oxide), polydimethylsiloxane-containing segmented copolymers, copolyetheresteramides, copolyethylene trephthalate-ethylene oxide, and polyurethane-polydimethylsiloxane.

Preferably the host polymer is a thermoplastic elastomer. By a "thermoplastic elastomer" is meant a thermoplastic co-polymer which has, as part of its macromolecular chain structure, sequences or segments which phase separate to provide a phase nanodomain. Such a co-polymer will generally comprise hard-segment and soft-segment phase domains. At least one of the phase separated domains must provide for a rubbery or soft phase domain. All of the host polymers listed in the immediately preceding paragraph are thermoplastic elastomers.

A preferred thermoplastic elastomer is a thermoplastic segmented polyurethane (TPU). Segmented TPU's are linear block co-polymers consisting of alternating hard and soft segments. The hard-segment is typically composed of alternating diisocyanate and chain extender molecules (eg. diol or diamine compounds), while the soft-segment is formed from a linear long-chain polyol. Due to their thermodynamic incompatibility, the hard and soft segments phase separate to a certain extent. These phase separated segments tend to aggregate into domains resulting in a structure having glassy, hard domains, and rubbery, soft domains, that are respectively below and above their $T_g$'s. The hard domains gain their rigidity through physical crosslinking (ie. hydrogen bonding between hard segments), and provide filler-like reinforcement to the soft domains.

The hard or soft segments in the TPU's may provide for a phase nanodomain. Generally, both the hard and soft segments will each provide for a phase nanodomain. The hard or soft segments may also be present as the continuous or discontinuous phase. To a large extent, the nature of the continuous or discontinuous phase will be dictated by the weight % of each segment present in the co-polymer, with the segment present in the lowest weight % generally forming the discontinuous phase. It is preferred that the discontinuous phase is formed by the hard segments, and these segments therefore preferably represent less than 50 wt %, more preferably less than 40 wt %, most preferably from about 10 to about 35 wt % of the TPU.

Constituents from which TPU's may be derived, namely diisocyanates, chain extender compounds and polyols, are generally well known to those skilled in the art. Suitable diisocyanate compounds include, but are not limited to, 4,4'-methylene diphenyl diisocyanate (MDI), toluene diisocyanate (TDI), naphthalene diisocyanate (NDI), hexamethylene diisocyanate (HDI), 4,4'-methylenebis(cyclohexyl iso-cyanate) (H12 MDI), isophorone diisocyanate (IPDI), and mixtures thereof.

Suitable chain extender compounds include, but are not limited to, ethylene diamine, 1,3-cyclohexane diamine (HMPD), 1,4-cyclohexane diamine (HPPD), 1,3-propylene diamine (1,3-PDA), 2-methylpentamethylene diamine (MPMD), 1,2-propylene diamine (1,2-PDA), 1,2-diaminoethane (EDA), ethylene glycol (EG), tetramethylene glycol (TMG), 1,4-butanediol (BDO), 1,4-cycloxehane dimethanol (CHDM), bishydroxybutyl tetramethyldisiloxane (BHTD), 2,2'-dimethyl propanediol (DPMD) and 2,2'-diethyl propanediol (DEPD), and mixtures thereof.

Suitable polyol compounds include, but are not limited to, polyethers such as those derived from tetramethylene glycol, ethylene glycol, propylene glycol, 3-methyl-1,5-pentanediol, tetrahydrofuran, 3-methyltetrahydrofuran, and co-polymers thereof, glycol-terminated polyesters such as those derived from the reaction products of ethylene glycol, tetramethylene glycol, and/or 2,2-dimethyl-1,3-propane diol with di-acids such as adipic acid, succinic acid, dodecanedioic acid, and combinations thereof, and polyetheresters derived from the aforementioned polyethers and polyesters, and diol-terminated polycarbonates such as poly(pentante-1,5-carbonate)diol and poly(hexane-1,6-carbonate)diol, and combinations thereof, polycarbonate-based polyols, polydimethylsiloxane-based polyols, and poly(hexamethylene oxide)-based polyols Generally, the number average molecular weight of the polyols will be in the range of 400 to 4000 Da.

A preferred segmented TPU is one which is derived from a poly(tetramethylene oxide) soft segment and a 4,4'-methylene diphenol diisocyanate/1,4-butane diol hard segment.

Other preferred TPU's and preferred thermoplastic elastomers that may be used as the host polymer in accordance with the invention include, but are not limited to, those described in WO 99/50327, WO 99/03863, WO 98/54242, WO 98/13405, WO 92/00338, WO 01/07499, WO 00/64971, and their US equivalents, the entire contents of which are incorporated herein by cross reference.

Preferred thermoplastic elastomers are sold under the tradenames ElastEon® by Aortech Biomaterials, Biospan®, Bionate®, Elasthane™, PurSil™ and Carbosil™ by The Polymer Technology Group, Pellethane™ by Dow, Spandex® and Lycra® by DuPont, and Chronoflex® and Chronothane® by Cardiotech International.

A polymer composite in accordance with the invention has solid particulate material dispersed throughout the thermoplastic host polymer. By being "dispersed" throughout the host polymer, it is meant that the solid particulate material is present as individual particles and/or small aggregates thereof throughout the polymeric matrix of the host polymer.

For avoidance of any doubt, the geometric attributes of the small anisometric nanoparticles that may be used in accordance with the invention are those which are provided by the particulate material upon being dispersed throughout the host polymer. In other words, the geometric attributes of the small anisometric nanoparticles referred to herein relate to those that are measured when the particulate material is dispersed in the host polymer and not those that are measured from the particulate material per se.

It is to be understood therefore that such geometric attributes of the small anisometric nanoparticles may be provided by an individual particle and/or from small aggregates of such particles.

It is believed that the advantages of the invention are realised through the dispersion of small anisometric nanoparticles throughout the host polymer. The small anisometric nanoparticles will generally have height, length and width dimensions which are all about 50 nm or less, with at least one of these dimensions being substantially less than one or both of the other dimensions. For convenience, such small nanoparticles will hereinafter be referred to as having "requisite" geometry or "requisite" geometric attributes. Conversely, particles that do not have requisite geometric attributes will hereinafter conveniently be referred to as particles having the "non-requisite" geometry or "non-requisite" geometric attributes. Particles having non-requisite geometric attributes will therefore generally be particles having at least one height, length or width dimension which is greater than about 50 nm, and/or particles which are substantially symmetrical.

The small ansiometric nanoparticles with the requisite geometric attributes have height, length and width dimensions which are all about 50 nm or less. By "height, length and width dimensions" is meant that the particles are in effect three dimensional objects by virtue of presenting dimensions in the x, y, and z directions of a standard three dimensional axis. The height of the small nanoparticles may alternatively be know as its thickness.

At least one of the height, length and width dimensions of the particles having requisite geometric attributes is substantially less than one or both of the other dimensions. By being "substantially less" is meant that the at least one dimension is less than or equal to about half of the largest dimension of the particle. For example, if the largest dimension of the nanoparticles is about 50 nm, at least one of the other dimensions should be no greater than about 25 nm. Accordingly, the solid particulate material will generally comprise nanoparticles having dimensions which do not exceed about 50 nm in size and which are substantially anisometric. By these geometric limitations, such nanoparticles are in effect excluded from having a substantially spherical shape.

In considering the geometric attributes of the small nanoparticles, it can be convenient to refer to the aspect ratio of the particles. As used herein, the term "aspect ratio" is intended to define the ratio between the largest and smallest dimensions of the particles having requisite geometric attributes. For example, a small nanoparticle used in accordance with the invention having a largest dimension of about 50 nm should have an aspect ratio of at least about 2:1. Preferably, the aspect ratio of the particles having requisite geometric attributes is at least about 5:1, more preferably at least about 10:1.

It is generally preferred that the aspect ratio of particles having requisite geometric attributes does not exceed about 100:1, more preferably about 50:1. Accordingly, for particles having a largest dimension of about 50 nm, it is preferred that the smallest dimension is no less than about 0.5 nm. Irrespective of aspect ratio, it is preferred that the smallest dimension of the particles having requisite geometric attributes is no less than about 0.5 mm.

Particles having requisite geometric attributes might therefore be conveniently described as having an elongate or platelet-like shape.

The geometric shape and size of the small nanoparticles is considered to be an important feature of the invention. In particular, by being relatively small and having an elongate or platelet-like geometric shape, it is believed that the particles can efficiently align themselves with host polymer chains when the composite is subjected to an elongational force such that the largest dimension of the particles is aligned substantially parallel to the direction of the applied force. By having such an alignment, the small nanoparticles are believed to provide for a maximum polymer chain/particle interaction and optimised cooperation between said particles and the phase nanodomain(s).

Improved properties, such as reduced modulus, imparted to the polymer composite by dispersed particles having requisite geometric attributes can be counteracted by the presence of dispersed particles having non-requisite geometric attributes. However, in some applications it may be desirable that the polymer composite also comprises particles having non-requisite geometric attributes, for example to increase the modulus of the composite. Given that nanoparticulate materials will often be made up of particles having a shape and/or size distribution rather than particles of a uniform shape and/or size, from a practical point of view polymer composites in accordance with the invention may inherently comprise particles having non-requisite geometric attributes. Nevertheless, provided that the aforementioned effects imparted to the polymer composite by the dispersed particles having requisite geometric attributes is greater than any net detrimental effect imparted by the dispersed particles having non-requisite geometric attributes, the polymer composite will exhibit improved properties.

Solid particulate material used in accordance with the invention that comprises particles having a shape and/or size distribution may conveniently be referred to as a mixture of solid particulate materials. In this case, the particles which make up the shape and/or size distribution may be the same or different. In other words, the distribution may be made up from particles that have a different chemical composition.

The solid particulate material used in accordance with the invention will generally comprise particles of which at least 50 wt % have the requisite geometric attributes. It is preferred that 60 wt % or greater, more preferably 70 wt % or greater, most preferably 90 wt % or greater, of the solid particulate material which is dispersed throughout the host polymer has the requisite geometric dimensions.

Reference to the wt % of particles in the solid particulate material having the requisite geometry will in most cases be appropriate to define the proportion of small anisometric nanoparticles. However, where the solid particulate material being used comprises particles with a non-requisite geometry, and such material is made up from particles having different compositions and bulk physical properties such as density (for example as in a mixture of different layered silicates), it may be more appropriate to consider the required proportion of small anisometric nanoparticles in terms of number rather than weight %. In this case, the solid particulate material will generally comprise at least 50% by number of particles having the requisite geometry. It is preferred that at least 60% by number, more preferably at least 70% by number, most preferably at least 90% by number, of the solid particulate material which is dispersed throughout the host polymer has the requisite geometric dimensions.

In some applications it will be preferred that substantially all (ie $\geq$95% by number or 95 wt %) of the solid particulate material dispersed throughout the host polymer has the requisite geometric attributes.

As discussed above, a polymer composite in accordance with the present invention may comprise a distribution of particles sizes which have requisite and non-requisite geometric attributes. In this case, particles with non-requisite geometric attributes may have one or more dimensions that greater than about 1 micron. Preferably, particles with non-requisite geometric attributes have dimensions which are all less than about 1 micron, more preferably less than about 500 nm, most preferably less than about 300 nm. It is particularly preferred that all solid particulate material dispersed throughout the host polymer in a polymer composite in accordance with the invention has dimensions which are all less than about 150 nm.

The host polymer preferably comprises at least 0.1 wt %, more preferably at least about 0.5 wt %, and most preferably from about 0.5 wt % to about 10 wt % of solid particulate material.

By dispersing particles of requisite geometry throughout the host polymer, the polymer composite can exhibit improved tensile strength, relative to the composite absent the particles or where no particle having non-requisite geometry are present relative to the host polymer per se. The polymer composite preferably exhibits at least a 20%, more preferably at least a 50%, most preferably at least a 100%, increase in tensile strength relative to the composite absent the particles, or where no particles having non-requisite geometry are present relative to the host polymer per se, as measured by a standard tensile test using an Instron or similar instrument.

To date it has also been generally accepted in the art that hysteresis and permanent set of a polymer will increase significantly when particulate material is dispersed therethrough. This effect is believed to result from the particulate material causing the mobility of polymer chains to decrease during deformation of the polymer, which in turn inhibits the strained polymer chains from returning to their position prior to the deformation. Where a polymer composite is to be used in applications demanding tensile and/or compressive resilience, low hysteresis and permanent set properties can be particularly desirable.

In addition to providing for an increase in tensile strength and a low modulus increase, the polymer composite in accordance with the invention may also advantageously exhibit an increase in hysteresis of less than about 70%, relative to the hysteresis of the host polymer. The polymer composite preferably exhibits an increase in hysteresis of no more than about 40%, more preferably no more than about 30%, most preferably no more than about 20%, relative to the hysteresis of the host polymer as determined by tensile hysteresis measurement ($5^{th}$ cycle, 100% strain) performed on an Instron model 4505 universal testing machine.

The polymer composite in accordance with the invention may also advantageously exhibit an increase in permanent set of less than about 50%, relative to the permanent set of the host polymer. The polymer composite preferably exhibits an increase in permanent set of no more than about 30%, more preferably no more than about 15%, most preferably no more than about 5%, relative to the permanent set of the host polymer as determined by tensile hysteresis measurement ($5^{th}$ cycle, 100% strain) performed on an Instron model 4505 universal testing machine. The permanent set is to be taken as the strain at which a zero load is measured on the unloading cycle (i.e. the $5^{th}$ cycle).

Without wishing to be limited by theory, it is believed that despite providing for increased polymer chain/particle interaction, the relatively small geometric size and shape of the requisite particulate material enables the polymer chains to retain a comparable degree of mobility under deformation compared with the host polymer absent these particles.

Accordingly, after deformation the polymer chains in the polymer composite have a similar ability to return to their location prior to deformation as the polymer chains in the host polymer per se.

A polymer composite in accordance with the invention is also expected to exhibit good toughness, tear resistance, fatigue and flex fatigue crack growth resistance.

A diverse array of particulate materials may be used in accordance with the invention provided that they can be dispersed throughout the host polymer and have a sufficient proportion of particles with the requisite geometric attributes. Suitable particulate materials include, but are not limited to, metal oxides, carbon or boron nanotubes or fibres, layered silicates, or combinations thereof.

Those skilled in the art will appreciate that there is a diverse array of nanoscale metal oxide particles. There is no particular limitation as to the type of metal oxide that may be used as the solid particulate material in accordance with the invention. Illustrative metal oxides include, but are not limited to, alumina, silica, zirconia, titania, $Cr_2O_3$, $CeO_2$, and $La_2O_3$.

Carbon or boron nanotubes or nanofibres are known in the art and do not need to be described in detail here. Preferred carbon or boron nanotubes or nanofibres are those having a length of less than 100 nm.

As used herein, the term "layered silicate" is intended to be a reference to materials which have as part of their molecular structure sheet sub-structures derived from the $(SiO_4)_{n4}$-repeat unit. Such materials may also be referred to as a "phyllosilicate", a word having a Latin origin meaning sheet-like silicate. The silica sheets in layered silicates are generally associated with one or more other sheet sub-structures, for example alumina sheets, to provide for a layer which is repeated throughout the material. In an ideal structure, these repeating layers are held together by van der Waals bonds and are separated by an interlayer space which may contain water. However, in reality the structure of layered silicates is usually more complex as a result of isomorphous substitutions. Thus, in practice substitution of atoms within the layered silicate structure with atoms having a lower valance state and/or vacancies in the layered structure lattice, generally results in a residual negative charge within the layers. This residual negative charge is in turn balanced by the inclusion of cations such as $Na^+$, $K^+$ and $Ca^{2+}$ etc which reside within the interlayer space and give rise to the cation exchange capacity (CEC) of layered silicates.

Layered silicates that can be used as the solid particulate material in accordance with the invention may be naturally derived or synthetically prepared. Suitable natural layered silicates include, but are not limited to, smectite clays, such as montmorillonite, saponite, hectorite, mica, vermiculite, bentonite, nontronite, beidellite, volkonskoite, magadite, kenyaite. Suitable synthetic layered silicates include, but are not limited to, synthetic mica, synthetic saponite, synthetic hectorite, synthetic magadite, and synthetic kenyaite. The layered silicates may also have a modified structure, for example as a result of being fluorinated. Preferred fluorinated layered silicates include, but are not limited to, fluorinated montmorillonite, and fluorinated mica.

Preferred layered silicates are those commonly referred to as 2:1 phyllosilicates. Preferred 2:1 phyllosilicates are selected from natural, synthetic or modified montmorillonite, saponite, bentonite, and mica.

The required proportion of particles with the requisite geometric attributes may be inherent to the solid particulate material as sourced, or it can be attained by subjecting the material to a suitable processing means. Solid particulate material that can be synthetically prepared can often be made such that it comprises a sufficient proportion of particles with the requisite geometric attributes, whereas natural sources of the particulate material will often require some form of processing in order to render it with a sufficient proportion of particles with the requisite geometric attributes. For example, some synthetic layered silicates can be prepared with a relatively narrow particle size distribution with a high proportion of particles (ca at least 60%) having the required geometric shape and size. Whereas large particle size synthetic or naturally occurring layered silicates may have to be subjected to, for example, a high energy milling or micronising processes in order to attain a sufficient proportion of particles with the requisite geometric attributes. Such a high energy milling process might generally involve preparing a dilute slurry of the silicate in liquid such as ethanol or water. The slurry is then added to a container into which the milling media, such as ceramic beads, are also added to fill a substantial portion of the volume of the container. The milling media can then be moved at high speed in relation to the slurry by means such as a rotating impeller or rotation of the container to comminute the silicate.

Suitable commercially available layered silicates having a sufficient proportion of particles with the requisite geometric attributes for use in accordance with the invention without further processing (ie comminution) include, but are not limited to, Laponite™ sold by Rockwood Additives Ltd, and Lucentite™ sold by CBC Co. Ltd, Tokyo, Japan.

There are no particular limitations as to the technique used to disperse the solid particulate material throughout the host polymer matrix. The material may, for example, be combined with monomers during their polymerisation to form the host polymer. The dispersing technique could also involve dissolving the host polymer into a suitable solvent and introducing the material to the solution of polymer. The solvent from the resultant liquid composition can then be evaporated to leave the host polymer having the solid particulate material dispersed therethrough, for example as in a polymer casting process.

A further technique for dispersing the solid particulate material throughout the host polymer could also involve melt mixing the polymer with the material. Suitable apparatus for melt mixing the host polymer with the solid particulate material include, but are not limited to, continuous and batch mixes, extruders such as single screw and twin screw extruders, static mixes, cavity transfer mixes and combinations of two or more thereof. It is preferred that the melt mixing is conducted in either a co- or counter-rotating twin screw extruder. The temperatures at which the melt mixing is conducted will vary depending upon the nature of the host polymer. Those skilled in the art could readily determine the appropriate temperature at which the melt mixing process should be conducted. The solid particulate material may be physically mixed with the host polymer prior to melt mixing, or may be introduced as a separate feed during melt mixing.

A dispersing agent may be used to facilitate the dispersion of the solid particulate material throughout the host polymer. The dispersing agent will exhibit a degree of surface activity toward the particulate material and promote a more efficient distribution of the particles throughout the host polymer. Generally, the dispersing agent will have surfactant-like properties whereby a portion of the agent has an affinity toward the particulate material and a separate portion of the agent has an affinity toward the host polymer.

Preferably, the solid particulate material used in accordance with the invention is a layered silicate. As sourced, layered silicates suitable for use with the invention may be in the form of an agglomeration of individual platelet particles that are closely stacked together like a deck of cards, in domains called tactoids. These tactoids will often be relatively large in size, and upon being dispersed throughout the host polymer can exfoliate or delaminate to provide for smaller aggregates and/or individual platelet particles having the requisite geometric attributes. However, in practice the degree of exfoliation may vary and a percentage of the silicate dispersed throughout the host polymer may have larger dimensions than that required in accordance with the invention. In this case, it is preferred that at least 50 wt %, more preferably greater than 70 wt %, most preferably greater than 90 wt %, of the layered silicate is dispersed throughout the host polymer with the requisite geometric attributes.

To facilitate the exfoliation of the layered silicates throughout the host polymer, it is preferred that they are modified with a dispersing agent. Those skilled in the art will appreciate the various techniques and agents that may be employed for this purpose, and generally all such techniques and agents can be utilised. One useful approach for modifying a layered silicate with a dispersing agent is to make use of the CEC of the layered silicate. In this case, cationic dispersing agents can be exchanged with the ion-exchangeable inorganic cations that reside between the layers of the silicate material. By this process the dispersing agent can be inserted (intercalated) between the layers of the silicate material. Generally, the intercalated dispersing agent functions to render the hydrophilic layered silicate structure more hydrophobic and therefore more dispersible throughout the host polymer.

Although the CEC of the layered silicate is not particularly limited, it is, for example, preferably 25 to 200 meq/100 g, more preferably 50 to 150 meq/100 g, most preferably 90 to 130 meq/100 g. If the CEC of the layered silicate is less than about 25 meq/100 g, the amount of cationic dispersing agent that can be intercalated between the layers of the layered silicate by ion exchange becomes small, and the efficiency of the dispersing agent is reduced. On the other hand, if the CEC exceeds about 200 meq/100 g, the ionic bonding strength between the layers of the layered silicate become too strong, and the dispersing agent becomes less able to facilitate exfoliation.

Ion-exchangeable dispersing agents will typically be in the form of an organic cation derived from an organic cation salt. As used herein, the term "organic cation" includes any positively charged ion which comprises at least one carbon atom having at least one bond to hydrogen or another carbon atom. The organic cation may comprise any other heteroatom of the periodic table, and the positive charge need not, and normally does not reside on the carbon atom. More than one positive charge may be present. The organic cation will generally comprise at least one ligand or residue comprising at least 8 carbon atoms. Examples of organic cations include, but are not limited to, organometallic cations (such as ferrocenium cations and/or their derivatives), as well as "onium" cations having organic substituent groups. The organic cation is normally accompanied by a charge balancing anion, to form a salt of the organic cation. The charge balancing anion, which may be generically symbolised as "X⁻" may be any chemically stable anionic group or residue that does not structurally change or react with the organic cation, including halides, hydroxide, carbonates, alkoxides, carboxylates, phosphates, silicates, or the like.

Organic cations may be "onium" cations having a positively charged nitrogen, phosphorus, sulfur, or oxygen atom, in addition to the at least one carbon atom. Suitable ammonium and phosphonium organic cations may be represented by the following formula (I):

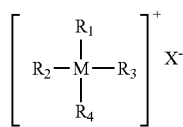

(I)

where M is either nitrogen or phosphorous; and $R_1$, $R_2$, $R_3$, and $R_4$ are independently organic and/or oligomeric ligands or may be hydrogen, and at least one of $R_1$, $R_2$, $R_3$, and $R_4$ comprises at least one organic or oligomeric group comprising at least one carbon atom. Ammonium and phosphonium cations are normally accompanied by a charge balancing $X^-$ anion, to form an ammonium or phosphonium salt. Preferred $X^-$ anions may include a halide, hydroxide, or acetate anion, preferably chloride or bromide.

In formula (I) examples of useful organic ligands include, but are not limited to, linear or branched alkyl, alkenyl or alkynyl groups having from 1 to 22 carbon atoms, arylalkyl groups which are benzyl and substituted benzyl moieties including fused-ring moieties having linear chains or branches of from 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having from 2 to 6 carbon atoms, or alkylene oxide groups having repeating units comprising from 2 to 6 carbon atoms. Examples of useful oligomeric ligands include, but are not limited to poly(alkylene oxide), polystyrene, polyacrylate, polycaprolactone, and the like.

In formula (I) $R_1$ and $R_2$ may be organic ligands. At least one of $R_1$ and $R_2$ may comprise a long chain alkyl or alkenyl group having at least 8 carbon atoms, or more preferably between about 12 and 24 carbon atoms. Alkenyl groups comprise a mono-unsaturated or multiply-unsaturated hydrocarbon group of from 2 to 24 carbon atoms, or more preferably, from 12 to 22 carbon atoms. At least one of $R_1$ and $R_2$ may be a lower alkyl group (ie. an alkyl group of 1 to 4 carbon atoms), such as a methyl group.

Examples of useful organic cations in formula (I) may include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations in formula (I) include, but are not limited to alkyl ammonium ions such as dodecyl ammonium, octadecyl trimethyl ammonium, bis(2-hydroxyethyl) octadecyl methyl ammonium, bis(2-hydroxyethyl) methyl tallow ammonium, bis(2-hydroxyethyl) methyl hydrogenated tallow ammonium, octadecyl benzyl dimethyl ammonium, and the like or mixtures thereof.

Useful alkoxylated ammonium compounds may include mono-alkoxylated, di-alkoxylated, tri-alkoxylated, and tetra-alkoxylated ammonium compounds, wherein the alkoxylate group comprises at least one alkyleneoxide group having from 2 to 6 carbon atoms. Alkoxylate groups may be hydroxyalkygroups, having at least one terminal hydroxyl (—OH) group bound to any one of the carbon atoms.

Examples of useful alkoxylate ligands include, but are not limited to hydroxyethyl, hydroxypropyl, hydroxybutyl, poly (ethylene oxide), poly(propylene oxide), poly(butylene oxide), and the like.

Useful mono-alkoxylated ammonium salts may be represented by the following formula (II):

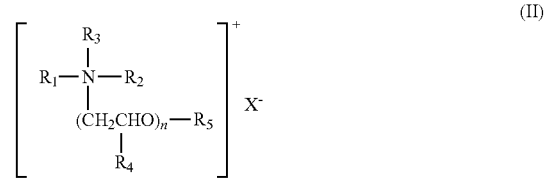

(II)

where N represents nitrogen; $X^-$ represents an anion which may be a halide atom such as chloride or bromide; $R_1$, $R_2$, and $R_3$ may be the same or different and may be selected from organic and oligomeric ligands comprising from 1 to 30 carbon atoms or may be hydrogen; n is at least 1; $R_4$ is selected from hydrocarbons comprising from 1 to 4 carbon atoms, hydrogen, and their mixtures; and $R_5$ is selected from hydrocarbons comprising from 1 to 7 carbon atoms, and hydrogen. Illustrative of suitable mono-alkoxylated amine compounds, which are converted to the ammonium salt by reaction with a Bronsted acid, include, but are not limited to those under the trade name of JEFFAMINE (of Huntsman Chemical). A preferred mono-alkoxylated amine compounds is $(CH_3)_3N^+CH_2CH_2OH/Cl^-$.

Useful di-alkoxylated ammonium salts may be represented by the following formula (III):

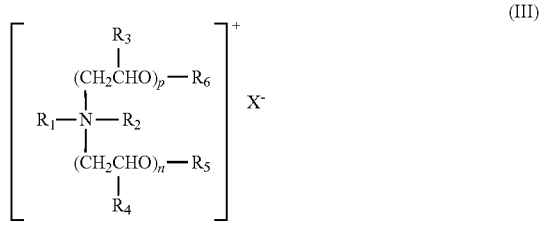

(III)

where N represents nitrogen; $X^-$ represents an anion which may include a halide atom such as chloride or bromide; $R_1$ and $R_2$ may be the same or different and are selected from organic and oligomeric ligands comprising from 1 to 30 carbon atoms or may be hydrogen; p and n are at least 1; and $R_3$, $R_4$, $R_5$ and $R_6$ may be same or different and are selected from hydrocarbons comprising 1 to 4 carbon atoms and hydrogen. $R_1$ and $R_2$ may be organic ligands. At least one of $R_1$ or $R_2$ may comprise a long chain alkyl or alkene group having at least 8 carbon atoms, or from about 12 to 24 carbon atoms. At least one of $R_1$ and $R_2$ may be a lower alkyl group, such as a methyl group. $R_3$, $R_4$, $R_5$ and $R_6$ may be hydrogen.

Examples of useful di-alkoxylated ammonium compounds include, but are not limited to bis(2-hydroxymethyl), octadecyl ammonium, bis(2-hydroxyethyl), octadecylmethyl ammonium, octadecylisopropoxydimethyl-1 ammonium, and the like or mixtures thereof.

Useful tri-alkoxylated ammonium salts may be represented by the following formula (IV):

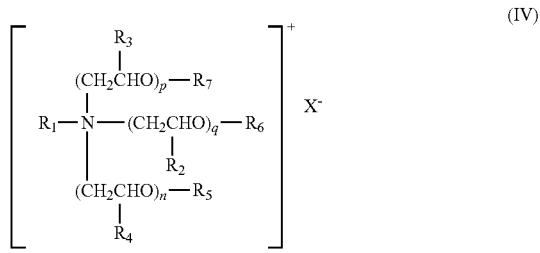

(IV)

where N represents nitrogen; $X^-$ represents an anion which is preferably a halide atom such as chloride or bromide; $R_1$ is selected from organic and oligomeric ligands comprising from 1 to 30 carbon atoms or may be hydrogen; n, p, and q are at least 1; and $R_2$, $R_3$, $R_4$, $R_5$, $R_6$ and $R_7$ may be same or different and are selected from hydrocarbons comprising from 1 to 4 carbon atoms and hydrogen.

Useful tetra-alkoxylated ammonium salts may be represented by the following formula (V):

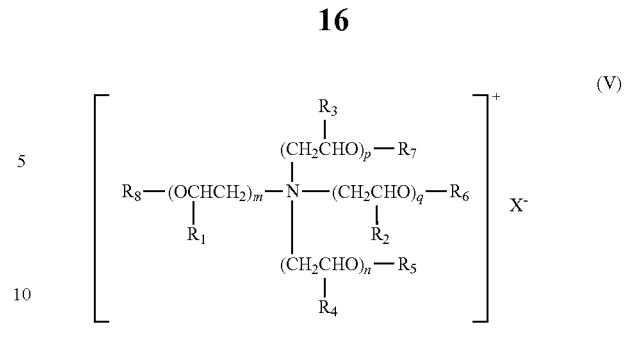

(V)

where N represents nitrogen; $X^-$ represents an anion which may be a halide atom such as chloride or bromide; m, n, p and q are at least 1; and $R_1$, $R_2$, $R_3$, $R_4$, $R_5$, $R_6$, $R_7$ and $R_8$ may be same or different and are selected from hydrocarbons comprising 1 to 4 carbon atoms and hydrogen.

The preferred alkoxylated ammonium salts are di-ethoxylated ammonium salts represented by the following formula (VI):

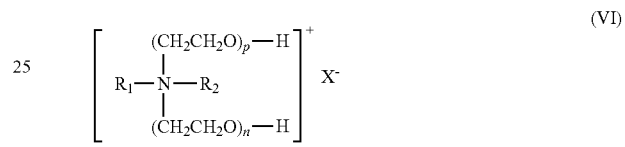

(VI)

where N represents nitrogen; $X^-$ represents an anion which is preferably a halide atom such as chloride or bromide; $R_1$ is selected from organic and oligomeric ligands comprising at least 8 carbon atoms; $R_2$ is selected from alkyl ligands comprising from 1 to 4 carbon atoms, or may be hydrogen; and p and n are at least 1.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units.

The method for ion exchange of the ion-exchangeable inorganic cations of the layered silicate with the cationic dispersing agent is not particularly limited, and known methods can be used. Generally, the ion exchange reaction will be performed in water, alcohol or mixtures thereof.

A typical method for performing the ion exchange reaction might involve adding the cationic dispersing agent to a stirred solution of the layered silicate in water, alcohol or combinations thereof. The solution is allowed to stir to provide for the exchange of the cationic dispersing agent with the metal ions between the layers of the layered silicate. After sufficient exchange has taken place, the solution is filtered and washed to remove any non-intercalated ionic species. The resulting modified layered silicate is then dried, and possible further processed by milling prior to use.

It is also possible to modify the layered silicate with the cationic dispersing agent at the same time as the silicate is being dispersed throughout the host polymer. For example, the host polymer could be dissolved in a suitable organic solvent and the layered silicate and the cationic dispersing agent introduced to this solution. Alternatively, the host polymer, the layered silicate and the cationic dispersing agent could all be combined in a melt mixing process. However, it is generally preferred that the layered silicate is modified with the cationic dispersing agent prior to it being dispersed throughout the host polymer.

The ion exchange reaction between the layered silicate and the cationic dispersing agent is preferably performed at a temperature in the range of 0° C. to 100° C., more preferably 10° C. to 80° C., most preferably 15° C. to 60° C.

Where the layered silicate is first modified with the cationic dispersing agent, the degree of intercalation that has taken place during the ion exchange reaction may be confirmed by means well known to those skilled in the art. For example, exchanged inorganic ions from the layered silicate in a filtrate can be determined by Inductively Coupled Plasma (ICP) emission spectrometry, and an increase in the interlayer spacing between the layers of the layered silicate can be determined by X-ray Diffraction (XRD) analysis, and a mass increase of the layered silicate can be determined using Thermogravometric Analysis (TGA). The degree of ion exchange is preferably 0.05 eq (5%) or more, more preferably 0.1 eq (10%) or more, most preferably 0.5 eq (50%) or more, for 1 eq of ion-exchangeable inorganic ions in the layered silicate.

Modification of layered silicates using cationic dispersing agents is generally quite effective at facilitating dispersion of the layered silicates throughout the host polymer. However, polymer composites comprising such modified layered silicates may have undesirable levels of extractable material, such as extractable salts of the cationic dispersing agents. The levels of extractable materials can be a particular problem when the polymer composite is prepared by a melt mixing process. In particular, at the temperatures at which the melt mixing is conducted, the ionic mechanism through which the cationic dispersing agent and the layered silicates bind can be thermally unstable and result in dissociation of the agent from the silicate. The dissociated dispersing agent may itself then be more readily extracted from the polymer composite, or it may undergo some type of degradation reaction to form products that can also be more readily extracted.

Where it is desirable that the polymer composite in accordance with the invention provides for a low level of extractable material, for example where the polymer composite is to be used in biomedical applications, and a layered silicate modified with a dispersing agent is to be used as the solid particulate material, it is preferable that the dispersing agent is of a type which can covalently bond to the surface layers of the layered silicate. Various dispersing agents capable of covalently bonding to the surface layers of layered silicates are known and may be used in the practice of this invention. Preferred dispersing agents of this type include, but are not limited to, a class of compounds known as silanes.

Suitable silane dispersing agents may be represented by the following formula (VII):

(VII)

where X is a group that is capable of being displaced by or is reactive with oxide functional groups on the surface layers of the layered silicate (eg. Si—OH) to provide a covalent bond between the silane and the layered silicate. Suitable X reactive groups include, but are not limited to, halo, alkoxy, alkenoxy, aryloxy, heterocyclyloxy, acyloxy and amine. Preferably X is selected from halo and alkoxy groups. Preferred halo groups include Cl, Br and I, and preferred alkoxy groups include methoxy, ethoxy, propoxy and butoxy.

In formula (VII) R is an organic group that is not displaceable by or reactive with oxide functional groups on the surface layers of the layered silicate (eg. Si—OH). The R group should remain attached to the silane during formation of the modified layered silicate and also during preparation of the polymer composite. The R group will typically be selected to be compatible (ie. in terms of polarity) with the host polymer to thereby facilitate the dispersion of the silicate throughout the host polymer. Suitable R groups include optionally substituted alkyl, optionally substituted aryl, alkyl optionally substituted alkoxyalkyl, optionally substituted alkoxyaryl, and —(Si($R^4$)$_2$—O)$_p$—$R^5$ where $R^4$ is independently selected from $C_1$ to $C_{10}$ alkyl, $R^5$ is selected from $R^4$ and hydrogen and p ranges from 1 to 25. Preferably, R groups are selected from optionally substituted $C_1$ to $C_{22}$ alkyl and —(Si($R^4$)$_2$—O)$_p$—$R^5$ as hereinbefore defined.

In formula (VII) $R^1$ is an organic group that contains a moiety that is reactive towards the host polymer and/or other non-silane dispersing agents that may also be used to modify the layered silicates, such as cationic dispersing agents, to provide for a covalent bond between the silane and the host polymer and/or the other dispersing agent. $R^1$ groups will not generally be reactive toward the oxide functional groups on the surface layers of the layered silicate, and the groups should remain attached to the silane during formation of the modified layered silicate and during preparation of the polymer composite. $R^1$ may be conveniently represented as —$R^2$—Z, where —$R^2$— is a divalent aliphatic chain or aromatic group which may be optionally substituted and/or contain one or more divalent heteroatoms or carbonyl groups. Alternatively, —$R^2$— may be —(Si($R^4$)$_2$—O)$_p$— where $R^4$ is independently selected from $C_1$ to $C_{10}$ alkyl and p ranges from 1 to 25. Preferably, —$R^2$— groups are selected from an optionally substituted alkyl chain having from 1 to about 22 carbon atoms, more preferably having from 1 to about 15 carbon atoms, and —(Si($R^4$)$_2$—O)$_p$— as hereinbefore defined. Z is a reactive moiety selected from —OH, —H, —N($R^3$)$_2$, —C(O)—N($R^3$)$_2$, —C(O)Y, —SH, —S(O)$_2$Y, and —N=C=O, where Y is Cl, Br or I, and $R^3$ is the same or different at each occurrence and is hydrogen or alkyl. Preferably, $R^3$ is selected from hydrogen and alkyl having from 1 to about 10 carbon atoms, more preferably having from about 1 to about 6 carbon atoms and most preferably from 1 to about 4 carbon atoms.

In formula (VII), m is 0, 1 or 2, and n is 1, 2 or 3, with the proviso that the sum of m and n is equal to 3.

WO 93/11190 and its US equivalent contemplates similar silane compounds to those defined by formula (VII), and is herein incorporated in its entirety by cross reference.

The silane compounds may also be represented by the following formula (VIII):

(VIII)

where both X and R are as defined above for formula (VII), and n is 1, 2 or 3.

Preferred silane compounds include, but are not limited to, optionally substituted $C_1$ to $C_{18}$ alkyl mono-, di- or tri-alkoxy silanes and 3-isocyanatopropyltrimethoxysilane.

Other techniques may also be used to facilitate dispersing the solid particulate material throughout the host polymer. Such techniques include, but are not limited to, electron beam surface modification, plasma surface modification, and surface grafting of the solid particulate material. Such surface modification techniques are known, and are described in detail in a number of publications[2,3,4].

Unless stated otherwise, the term "alkyl" as used herein, denotes straight chain, branched or cyclic hydrocarbon residues, preferably $C_{1-22}$ alkyl, eg $C_{1-10}$ or $C_{1-6}$ Examples of straight chain and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2,-trimethylpropyl, 1,1,2-trimethylpropyl, heptyl, 5-methoxyhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propylocytl, 1-, 2- or 3-butylheptyl, 1-pentylhexyl, dodecyl, 1-, 2-, 3,4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", "butyl" etc, it will be understood that this can refer to any of straight, branched and cyclic isomers. An alkyl group may be optionally substituted by one or more optional substituents as herein defined. Accordingly, "alkyl" as used herein is taken to refer to optionally substituted alkyl. Cyclic alkyl may refer to monocyclic alkyl or, polycyclic fused or non-fused carbocyclic groups.

Unless stated otherwise, the term "alkenyl" as used herein denotes groups formed from straight chain, branched or cyclic hydrocarbon residues containing at least one carbon to carbon double bond including ethylenically mono-, di- or poly-unsaturated alkyl or cycloalkyl groups as previously defined, preferably $C_{1-22}$ alkenyl (eg $C_{1-10}$ or $C_{1-6}$). Examples of alkenyl include vinyl, allyl, 1-methylvinyl, butenyl, isobutenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1-4,pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substitutents as herein defined. Accordingly, "alkenyl" as used herein is taken to refer to optionally substituted alkenyl. Cyclic alkenyl may refer to monocyclic alkenyl or, polycyclic fused or non-fused alkenyl carbocyclic groups.

Unless stated otherwise, the term "alkynyl" as used herein denotes groups formed from straight chain, branched or cyclic hydrocarbon residues containing at least one carbon-carbon triple bond including ethylenically mono-, di- or poly-unsaturated alkyl or cycloalkyl groups as previously defined. Unless the number of carbon atoms is specified the term preferably refers to $C_{1-22}$ alkynyl. Examples include ethynyl, 1-propynyl, 2-propynyl, and butynyl isomers, and pentynyl isomers. An alkynyl group may be optionally substituted by one or more optional substituents as herein defined. Accordingly, "alkynyl" as used herein is taken to refer to optionally substituted alkynyl. Cyclic alkynyl may refer to monocyclic alkynyl or, polycyclic fused or non-fused alkynyl carbocyclic groups.

Unless otherwise stated, the terms "alkoxy", "alkenoxy", "alkynoxy", "aryloxy" and "heterocyclyloxy" as used herein respectively denote alkyl, alkenyl, alkynyl, aryl and heterocylclyl groups as herein defined when linked by oxygen.

The term "halo" denotes fluorine, chlorine, bromine or iodine.

Unless stated otherwise, the term "aryl" as used herein denotes single, polynuclear, conjugated and fused residues of aromatic hydrocarbon ring systems. Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Aryl may be optionally substituted as herein defined and thus "aryl" as used herein is taken to refer to optionally substituted aryl.

Unless stated otherwise, the term "heterocyclic" as used herein denotes mono- or polycarbocyclic groups, which may be fused or conjugated, aromatic (heteroaryl) or non-aromatic, wherein at least one carbon atom is replaced by a heteroatom, preferably selected from nitrogen, sulphur and oxygen. Suitable heterocyclic groups include N-containing heterocyclic groups, such as:

unsaturated 3 to 6 membered heteromonocyclic groups containing 1 to 4 nitrogen atoms, for example, pyrrolyl, pyrrolinyl, imidazolyl, imidazolinyl, pyrazolyl, pyridyl, pyrimidinyl, pyrazinyl, pyridazinyl, triazolyl or tetrazolyl;

saturated 3 to 6-membered heteromonocyclic groups containing 1 to 4 nitrogen atoms, such as, pyrrolidinyl, imidazolidinyl, piperidyl, pyrazolidinyl or piperazinyl;

condensed saturated or unsaturated heterocyclic groups containing 1 to 5 nitrogen atoms, such as, indolyl, isoindolyl, indolinyl, isoindolinyl, indolizinyl, isoindolizinyl, benzimidazolyl, quinolyl, isoquinolyl, indazolyl, benzotriazolyl, purinyl, quinazolinyl, quinoxalinyl, phenanthradinyl, phenathrolinyl, phthalazinyl, naphthyridinyl, cinnolinyl, pteridinyl, perimidinyl or tetrazolopyridazinyl;

saturated 3 to 6-membered heteromonocyclic groups containing 1 to 3 oxygen atoms, such as tetrahydrofuranyl, tetrahydropyranyl, tetrahydrodioxinyl, unsaturated 3 to 6-membered hetermonocyclic group containing an oxygen atom, such as, pyranyl, dioxinyl or furyl;

condensed saturated or unsaturated heterocyclic groups containing 1 to 3 oxygen atoms, such as benzofuranyl, chromenyl or xanthenyl;

unsaturated 3 to 6-membered heteromonocyclic group containing 1 to 2 sulphur atoms, such as, thienyl or dithiolyl;

unsaturated 3 to 6-membered heteromonocyclic group containing 1 to 2 oxygen atoms and 1 to 3 nitrogen atoms, such as, oxazolyl, oxazolinyl, isoxazolyl, furazanyl or oxadiazolyl;

saturated 3 to 6-membered heteromonocyclic group containing 1 to 2 oxygen atoms and 1 to 3 nitrogen atoms, such as, morpholinyl;

unsaturated condensed heterocyclic group containing 1 to 2 oxygen atoms and 1 to 3 nitrogen atoms, such as, benzoxazolyl or benzoxadiazolyl;

unsaturated 3 to 6-membered heteromonocyclic group containing 1 to 2 sulphur atoms and 1 to 3 nitrogen atoms, such as, thiazolyl, thiazolinyl or thiadiazoyl;

saturated 3 to 6-membered heteromonocyclic group containing 1 to 2 sulphur atoms and 1 to 3 nitrogen atoms, such as, thiazolidinyl, thiomorphinyl; and unsaturated condensed heterocyclic group containing 1 to 2 sulphur atoms and 1 to 3 nitrogen atoms, such as, benzothiazolyl or benzothiadiazolyl.

A heterocyclic group may be optionally substituted by an optional substituent as described herein.

Unless stated otherwise, the term "acyl" as used herein denotes a group containing the moiety C=O (and not being a carboxylic acid, ester or amide or thioester). Preferred acyl includes C(O)—R, wherein R is hydrogen or an alkyl, alkenyl, alkynyl, aryl or heterocyclyl, residue, preferably a $C_{1-20}$ residue. Examples of acyl include formyl; straight chain or branched alkanoyl such as, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyqxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. Acyl also refers to optionally substituted acyl.

Unless otherwise stated, the term "acyloxy" as used herein refers to acyl, as herein before defined, when linked by oxygen.

In this specification "optionally substituted" is taken to mean that a group may or may not be substituted or fused (so as to form a condensed polycyclic group) with one or more groups selected from alkyl, alkenyl, alkynyl, aryl, hydroxy, alkoxy, alkenyloxy, aryloxy, nitro, nitroalkyl, nitroalkenyl, nitroalkynyl, nitroaryl, nitroheterocyclyl, amino, alkylamino, dialkylamino, alkenylamino, alkynylamino, arylamino, diarylamino, acyl, acylamino, diacylamino, acyloxy, alkylsulphonyloxy, arylsulphenyloxy, heterocyclyl, heterocyloxy, heterocyclamino, carboalkoxy, carboaryloxy, alkylthio, arylthio, acylthio, cyano, nitro, sulfate and phosphate groups.

Preferred optional substitutents include alkyl, (eg $C_{1-6}$ alkyl such as methyl, ethyl, propyl, butyl, cyclopropyl, cyclobutyl, cyclopentyl or cyclohexyl), hydroxyalkyl (eg hydroxymethyl, hydroxyethyl, hydroxypropyl), alkoxyalkyl (eg methoxymethyl, methoxyethyl, methoxypropyl, ethoxymethyl, ethoxyethyl, ethoxypropyl etc) alkoxy (eg $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted), benzyl (wherein benzyl itself may be further substituted), phenoxy (wherein phenyl itself may be further substituted), benzyloxy (wherein benzyl itself may be further substituted), amino, alkylamino (eg $C_{1-6}$ alkyl, such as methylamino, ethylamino, propylamino etc), dialkylamino (eg $C_{1-6}$ alkyl, such as dimethylamino, diethylamino, dipropylamino), acylamino (eg $NHC(O)CH_3$), phenylamino (wherein phenyl itself may be further substituted), nitro, formyl, —C(O)-alkyl (eg $C_{1-6}$ alkyl, such as acetyl), O—C (O)-alkyl (eg $C_{1-6}$ alkyl, such as acetyloxy), benzoyl (wherein the phenyl group of the benzoyl may itself be further substituted), carbonyl, (ie replacement of $CH_2$ with C=O)$CO_2H$, $CO_2$alkyl (eg $C_{1-6}$ alkyl such as methyl ester, ethyl ester, propyl ester, butyl ester), $CO_2$-phenyl (wherein phenyl itself may be further substituted), $CONH_2$, CONHphenyl (wherein phenyl itself may be further substituted), CONHbenzyl (wherein benzyl itself may be further substituted), CONH alkyl (eg $C_{1-6}$ alkyl such as methyl ester, ethyl ester, propyl ester, butyl amide), CONHdialkyl (eg $C_{1-6}$ alkyl).

Where a layered silicate is used as the solid particulate material in accordance with the invention, it is preferred that the layered silicate is modified with a dispersing agent as discussed above.

The layered silicate may also be modified using the reaction product derived from a cationic dispersing agent and a silane dispersing agent. In this case, the silane agent will be selected to provide for a $R^1$ (as referred to in formula (VII)) organic group that contains a moiety that is reactive toward the cationic dispersing agent. For example, a silane compound such as 3-isocyanatopropyltrimethoxysilane, where X (as referred to in formula (VII)) is represent by methoxy, R (as referred to in formula (VII)) is not present and $R^1$ (as referred to in formula (VII) is —$R^2$—Z where $R^2$ is represented by propyl and Z is represented by —N=C=O, may react through the —N=C=O group with an ammonium dispersing agent to form a urea linkage. The resulting reaction product can then be used to modify the layered silicate through reaction of the —Si—OMe moieties of the modified silane compound with the —Si—OH moieties of the surface layers of the layered silicate to provide for a —Si—O—Si— covalent linkage between the silicate and the modified silane compound.

Those skilled in the art will appreciate that various other combinations of a silane dispersing agent and a cationic dispersing agent may be reacted to provide for a modified silane dispersing agent. Combinations of silane dispersing agents and cationic dispersing agents that provide for a urea linkage as described above may be particularly effective for modifying layered silicates that are to be used in preparing a polymer composite where the host polymer is a polyurethane. In particular, due to the high affinity of a urea linkage for a polyurethane, the layered silicates may be more readily dispersed throughout such a host polymer.

Those skilled in the art will have an understanding of techniques and agents that may be used to facilitate the dispersion of metal oxides and carbon or boron nanotubes or fibres throughout a polymer matrix.

Where the polymer composite in accordance with the invention is prepared by dispersing the solid particulate material throughout the host polymer using a melt mixing process, and the particulate material is a layered silicate, it is preferred that the layered silicate is modified with a silane dispersing agent.

In the case where the polymer composite in accordance with the invention is to be used in biomedical applications, it is preferred that the solid particulate material is a layered silicate modified with a silane dispersing agent. It is expected that polymer composites prepared in this manner can advantageously exhibit enhanced tensile strength and low levels of extractables. A preferred host polymer in preparing such biomedical polymer composites is polyurethane.

By "construction" material it is meant that the composite is either used to form an entire product or is used as part of a product. For example, the composite may be moulded or shaped into a product, or may be applied as a coating to a pre-made product.

As a biomedical construction material, the polymer composite may be used to manufacture products that are used ex vivo, in vivo and in vitro. It is believed that the polymer composite in accordance with the invention will be particularly useful in manufacturing products intended for in vivo use. Examples of such products include, but are not limited to, artificial intervertebral discs (AID), breast implant shells, heart valves, heart pacemaker connectors, coatings, lead insulators and fixation devices, suture material, vascular grafts and patches, endotracheal tubes, synthetic bile ducts, stents, catheters, electrodes for functional electrical stimulation etc. Examples of ex vivo or in vitro products that may be manufactured using the polymer composite include, but are not limited to, condoms, surgical gloves, blood bags, their closures and fittings, blood oxygenating tubing, cardiac-assist pump bladders and their associated tubing, housing and coatings.

The polymer composite may be used as a biomedical construction material to manufacture products suitable for use in humans and other animals.

The polymer composite may also be used in other applications such as textiles, wear linings, actuators, electrical or optical devices (ie where strain alters optical or electrical properties of the composite material) and polaroid material.

The invention will now be described with reference to the following non-limiting examples which are included for the purpose of illustrating the invention only, and not to be construed as limiting the generality hereinbefore described.

EXAMPLES

Example A

General

Segmented thermoplastic polyurethane nanocomposites containing two different size fractions of SOMASIF MEE (a synthetic organically modified fluoromica sold by CO-OP Chemical Company (Japan)) were prepared by a solvent casting technique. The average largest platelet dimension of the size fractions in each composite was approximately 500 nm and 30 nm, the average smallest platelet dimension of each size fraction was found to be approximately 1 nm, as measured by transmission electron microscopy (TEM). The largest size fraction (500 nm) was that of the fluoromica as sourced, and the smaller size fraction (30 nm) was obtained by subjecting the fluoromica as sourced to a high energy milling process. X-ray diffraction (XRD) and thermogravimetric (TGA) analysis of the milled fluoromica was used to confirm that the milling process did not remove the cationic dispersing agent from the silicate. The fluoromica was found to disperse quite well throughout the polyurethane, and the resulting polymer composite comprising the small size fraction (30 nm) of fluoromica particles was found to exhibit superior tensile strength compared to the polyurethane absent the fluoromica, and the polyurethane comprising the larger size fraction (500 nm) of fluoromica particles. The polymer composite comprising the smaller size fraction (30 nm) of fluoromica particles was also found to exhibit hysteresis, permanent set and modulus that was comparable with the polyurethane absent the fluoromica particles, and significantly less than that exhibited by the polyurethane comprising the larger size fraction (500 nm) of fluoromica particles.

Materials

The thermoplastic segmented polyurethane (TPU) employed consisted of a 1000 g/mol poly(tetramethylene oxide) (PTMO) soft segment with a 4,4'-methylene diphenyl diisocyanate (MDI) and 1,4-butanediol (BDO) hard segment. The hard segment concentration was 35% by weight, resulting in a soft elastomer of Shore Hardness 80 A. The TPU was supplied by Urethane Compounds, Australia.

The organically modified synthetic fluoromica employed was somasif MEE (MEE), which was supplied by CO-OP Chemical Company (Japan). MEE is a synthetic fluoromica with chemical composition $Na_{0.66}Mg_{2.68}(Si_{3.98}Al_{0.02})O_{10.02}F_{1.96}$ and CEC of 115 meq. The MEE used was organically modified with a cationic dispersing agent, namely a dipolyoxyethylenecocomethyl ammonium surfactant as structurally represented directly below.

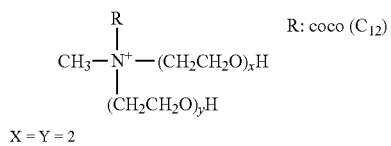

$X = Y = 2$

Preparation

The smaller size fraction (30 nm) of MEE was obtained by subjecting the MEE as sourced to a high energy milling process. Basically, this milling process involved preparing a dilute slurry of the silicate in either ethanol or water. The slurry was then added to a small stainless steel container into which ceramic milling beads were also added to fill a large amount of the volume. An impeller was then rotated at high speed to run the mill and comminute the silicate. The MEE as sourced provided for the larger size fraction. Nanocomposite films were prepared via solvent casting. A 5 wt % solution of dried MEE in toluene was ultrasonicated for 2 minutes before being added to a 5 wt % solution of TPU in dimethylacetamide (DMAc). The combined solution was then mixed vigorously for 1 minute in a high-shear homogenizer, followed by stirring for 24 hours at room temperature with a magnetic stirrer. The mixture was then cast onto glass plates and the films were dried under a nitrogen atmosphere at 50° C. for 48 hours and subsequently dried under vacuum at 50° C. for 12 hours.

The films were then annealed under vacuum at 80° C. for 12 hours and left for 1 month prior to characterisation. The nanocomposites contained 3 wt % organosilicate and the film thickness was roughly 0.5 mm.

Characterisation

Wide-angle X-ray diffraction (WAXD) analysis was performed on the MEE samples and the composites using a Bruker D8 Advance X-ray diffractometer with Cu Kα radiation generated at 40 kV and 30 mA. Samples were scanned at 2.4°/min in the range of 2θ=1-10° using a step size of 0.005°. The MEE powders were lightly pressed and flattened to obtain a smooth surface prior to testing.

Themogravimetric analysis (TGA) was performed on the MEE samples using a Shimadzu TGA 50. The temperature range investigated was 25-600° C. at a heating rate of 10° C. per minute.

Transmission electron microscopy (TEM) was performed on the polymer composites. Samples of the composites were cut on a Leica Ultracut S ultramicrotome with a glass knife at −100° C. and collected on 400 mesh copper grids. Images were obtained using a JEOL JEM 1010 TEM operated at 100 keV.

Tensile and hysteresis tests were performed on the polymer samples at 25° C. on an Instron model 4505 universal testing machine using 5 replicates of each material, Dumbbells were punched from an ATSM D-638-M-3 die and strained at 50 mm/min. Young's modulus was calculated from the slope at 0% strain on the tensile curve. The hysteresis values reported were measured on the 5$^{th}$ loading-unloading cycle. Permanent set was taken as the strain at which zero load was measured on the unloading cycle.

Results

Figure 2:
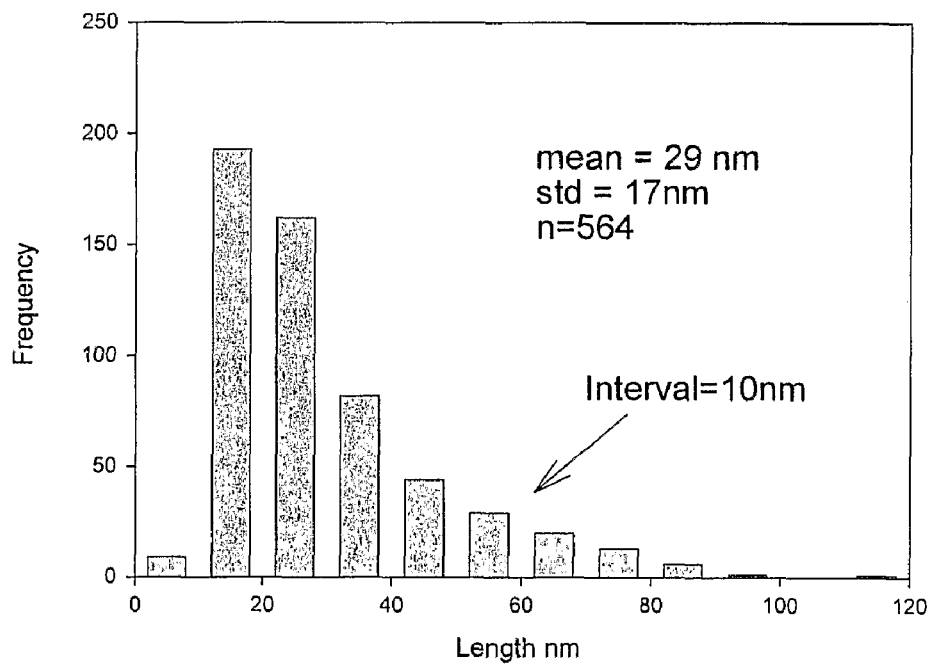
FIG. 2 is a histogram representing the dispersed particle size distribution in example TPU-S, as determined using the method employed by Formes and Paul[1].

TEM images of the nanocomposites containing the two size fractions of MEE indicated that the silicates were effectively delaminated and dispersed quite well throughout each composite. The effective aspect ratios of the different size fractions were measured to be approximately 500 nm and 30 nm in the nanocomposites, as determined using the method employed by Fornes and Paul[1]. The size distribution of the dispersed particles in the nanocomposites were also determined using the method employed by Fornes and Paul[1]. Histograms representing of the dispersed particle size distribution for the 500 nm and 30 nm nanocomposites are shown in FIGS. 1 and 2, respectively. In these Figures "n" represents that total number of particles measured, and "St Dev" or "std" denotes the standard deviation observed.

For convenience, the polymer composite comprising the larger size fraction of MEE (500 nm) will hereinafter be referred to as TPU-U (being a comparative example), and that comprising the smaller size fraction of MEE (30 nm) as TPU-S (being an example in accordance with the invention). A sample of the TPU comprising no MEE will hereinafter be simply referred to as TPU (also being a comparative example).

TGA was used to determine if the milling process had affected the organically modified form of the MEE. The thermograms showed that the dispersing agent remained largely intact during milling. This was evidenced by the fact that approximately the same fraction of organic matter burnt off from the milled fluoromica (MEE-S) and the unmilled fluoromica (MEE-U).

XRD analysis was performed on MEE-U, MEE-S, and the respective polymer composites prepared using these materials. As expected, the XRD patterns for the silicates and the polymer composites exhibited a decrease in intensity and peak broadening with a decrease in the size fraction of the silicates. The MEE silicates showed an interlayer spacing of approximately 20 Å, whereas the MEE silicates dispersed in the respective polymer composites showed an interlayer spacing of about 35 Å. The increased interlayer spacing of the MEE silicates dispersed in the polymer composites is believed to result from a degree of polymer intercalation.

Data from the tensile curves produced from the TPU, TPU-U and TPU-S samples are shown below in Tables 1 and 2. Table 1 shows a portion of the tensile stress-strain data over the range of 0% to 10% strain, and Table 2 shows tensile stress-strain data over the range of 0% to about 1600% strain. From Table 1 it can be seen that the tensile stress at a given percent strain for the TPU and TPU-S samples are quite similar, whereas at corresponding percent strain values the tensile stress for the TPU-U sample is notably higher. Data from this portion of the tensile curves may be used to evaluate the stiffness of the polymer samples. In particular, those skilled in the art will appreciate that the gradient of each curve derived from the data may be used as a measure of stiffness, with a higher gradient corresponding to a greater stiffness. Accordingly, the data in Table 1 is indicative of the TPU-S polymer composite having a comparable stiffness to the TPU polymer, and the TPU-U polymer composite having a considerably higher stiffness than both the TPU and TPU-S samples.

From the data in Table 2, it can be seen that, for a given strain value, the TPU-S polymer composite exhibits a significantly higher tensile stress than either of the TPU or TPU-U samples. Notably, the TPU-U polymer composite exhibits a lower ultimate tensile strength than that of the TPU polymer.

TABLE 1

Tensile stress-strain data over the range
0% to 10% strain for TPU, TPU-U and TPU-S.

| Strain (%) | Stress (MPa) |
|---|---|
| TPU | |
| 0 | 0 |
| 1 | 0.08 |
| 2 | 0.18 |
| 3 | 0.28 |
| 4 | 0.37 |
| 6 | 0.55 |
| 8 | 0.72 |
| 10 | 0.90 |
| TPU-S | |
| 0 | 0 |
| 1 | 0.08 |
| 2 | 0.19 |
| 3 | 0.31 |
| 4 | 0.40 |
| 6 | 0.60 |
| 8 | 0.78 |
| 10 | 0.96 |
| TPU-U | |
| 0 | 0 |
| 1 | 0.22 |
| 2 | 0.42 |
| 3 | 0.62 |
| 4 | 0.80 |
| 6 | 1.08 |
| 8 | 1.37 |
| 10 | 1.60 |

TABLE 2

Tensile stress-strain data over the range 0% to
about 1600% strain for TPU, TPU-U and TPU-S.

| Strain (%) | Stress (MPa) |
|---|---|
| TPU | |
| 0 | 0 |
| 200 | 4.6 |
| 400 | 7.0 |
| 600 | 10.5 |
| 800 | 15.4 |
| 967 | 20.1 |
| 1000 | 21.2 |
| 1200 | 27.9 |
| 1400 | 36.8 |
| 1500 | 42.1 |
| 1508 | 42.6* |
| 1521 | N/A |
| TPU-S | |
| 0 | 0 |
| 200 | 4.7 |
| 400 | 7.3 |
| 600 | 13.4 |
| 800 | 29.4 |
| 967 | 56.6* |
| 1000 | N/A |
| 1200 | N/A |
| 1400 | N/A |
| 1500 | N/A |
| 1508 | N/A |
| 1521 | N/A |

TABLE 2-continued

Tensile stress-strain data over the range 0% to about 1600% strain for TPU, TPU-U and TPU-S.

| Strain (%) | Stress (MPa) |
|---|---|
| TPU-U | |
| 0 | 0 |
| 200 | 4.7 |
| 400 | 6.6 |
| 600 | 9.6 |
| 800 | 13.5 |
| 967 | 16.8 |
| 1000 | 17.5 |
| 1200 | 21.9 |
| 1400 | 27.6 |
| 1500 | 30.8 |
| 1508 | 31.0 |
| 1521 | 31.3* |

N/A = Not applicable
*= Tensile stress at break

Hysteresis and permanent set data for the TPU, TPU-U and TPU-S samples are shown below in Tables 3 and 4, respectively. From Tables 3 and 4, it can be seen that the hysteresis and permanent set of the TPU-S polymer composite is comparable with that of the TPU polymer, whereas the respective values for the TPU-U polymer composite are considerably higher than both the TPU and TPU-S samples.

TABLE 3

Tensile Hysteresis data for TPU, TPU-U and TPU-S (calculated on $5^{th}$ loading-unloading cycle to 100% strain).

| Sample | Hysteresis (relative to TPU (%)) |
|---|---|
| TPU | 11.5 (0) |
| TPU-S | 14.3 (24) |
| TPU-30B* | 21.0 (83) |
| TPU-U | 25.0 (117) |

*TPU-30B defined in Example C.

TABLE 4

Permanent Set data for TPU, TPU-U and TPU-S (calculated on $5^{th}$ loading-unloading cycle to 100% strain).

| Sample | Permanent Set (relative to TPU (%)) |
|---|---|
| TPU | 13.6 (0) |
| TPU-S | 14.3 (5) |
| TPU-30B* | 23.0 (69) |
| TPU-U | 23.6 (74) |

*TPU-30B defined in Example C.

Example B

General

A segmented thermoplastic polyurethane nanocomposite containing organically modified LUCENTITE (a synthetic smectite sold by CO-OP Chemical Company (Japan)) was prepared by a solvent casting technique. The average platelet dimension (ie largest dimension) of LUCENTITE is approximately 25-30±10 nm, as measured by transmission electron microscopy (TEM). The resulting polymer composite comprising the LUCENTITE particles was found to exhibit superior tensile strength compared to the polyurethane absent the LUCENTITE, and the polyurethane comprising the larger size fraction (500 nm) of fluoromica particles, as presented in example A.

Materials

The thermoplastic segmented polyurethane (TPU) employed consisted of a 1000 g/mol poly(tetramethylene oxide) (PTMO) soft segment with a 4,4'-methylene diphenyl diisocyanate (MDI) and 1,4-butanediol (BDO) hard segment. The hard segment concentration was 35% by weight, resulting in a soft elastomer of Shore Hardness 80 A. The TPU was supplied by Urethane Compounds, Australia. This material possessed the same composition as the TPU presented in example A, but was made in a separate batch, and had slightly inferior tensile properties.

The synthetic smectite employed was LUCENTITE SWN, which was supplied by CO-OP Chemical Company (Japan). LUCENTITE SWN is a lithium magnesium sodium hydroxide silicate (Li0.66 Mg5.34 Na 0.66 (OH)4 (Si2O5)4) with a cationic exchange capacity (CEC) of 100 meq/100 g of silicate. The LUCENTITE was organically modified with a cationic dispersing agent, namely a oleyl methyl bishydroxyethyl ammonium chloride ($C_{18}H_{35}N(CH_3)(C_2H_4OH)_2Cl$) (Ethoquad O/12, Akzo-Nobel). This surfactant is very similar to the compound shown in Example A, except it has a slightly longer alkyl chain. The LUCENTITE was modified in a 1% by weight solution, with de-ionised water, to which the Ethoquad O/12 was added at an amount exceeding the CEC of the LUCENTITE by 20%. This solution was then left stirring for 24 hours, at 60° C. to allow for maximum conversion. The sample was then washed by centrifuge, where the sample was separated from solution, decanted, and mixed with fresh distilled water. This was repeated until no chloride ions were detectable, which was tested by the addition of AgCl solution to the decanted water.

Preparation

Nanocomposite films were prepared via solvent casting. A 5 wt % solution of dried organo-LUCENTITE in toluene was ultrasonicated for 2 minutes before being added to a 5 wt % solution of TPU in dimethylacetamide (DMAc). The combined solution was then mixed vigorously for 1 minute in a high-shear homogenizer, followed by stirring for 24 hours at room temperature with a magnetic stirrer. The mixture was then cast onto glass plates and the films were dried under a nitrogen atmosphere at 50° C. for 48 hours and subsequently dried under vacuum at 50° C. for 12 hours.

The films were then annealed under vacuum at 80° C. for 12 hours and left for 1 month prior to characterisation. The nanocomposites contained 3 wt % organosilicate and the film thickness was roughly 0.5 mm.

Characterisation

Transmission electron microscopy (TEM) was performed on the polymer composites. Samples of the composites were cut on a Leica Ultracut S ultramicrotome with a glass knife at −100° C. and collected on 400 mesh copper grids. Images were obtained using a JEOL JEM 1010 TEM operated at 100 keV.

Tensile and hysteresis tests were performed on the polymer samples at 25° C. on an Instron model 4505 universal testing machine using 5 replicates of each material. Dumbbells were punched from an ATSM D-638-M-3 die and strained at 50 mm/min. Young's modulus was calculated from the slope at 0% strain on the tensile curve.

Results

For convenience, the polymer composite comprising organo-LUCENTITE will hereinafter be referred to as TPU-LUC. A sample of the TPU comprising no LUCENTITE will hereinafter be simply referred to as TPU.

Data from the tensile curves produced from the TPU and TPU-LUC samples are shown below in Tables 5 and 6. Table 5 shows a portion of the tensile stress-strain data over the range of 0% to 10% strain, and Table 6 shows tensile stress-strain data over the range of 0% to about 1600% strain. From Table 5 it can be seen that the tensile stress at a given percent strain for the TPU and TPU-LUC samples are quite similar. Data from the tensile curves may be used to evaluate the stiffness of the polymer samples. In particular, those skilled in the art will appreciate that the gradient of each curve derived from the data may be used as a measure of stiffness, with a higher gradient corresponding to a greater stiffness. Accordingly, the data in Table 5 is indicative of the TPU-LUC polymer composite having a comparable stiffness to the TPU polymer.

From the data in Table 6, it can be seen that, for a given strain value, the TPU-LUC polymer composite exhibits a significantly higher tensile stress than the TPU sample.

TABLE 5

Tensile stress-strain data over the range
0% to 10% strain for TPU and TPU-LUC.

| Strain (%) | Stress (MPa) |
|---|---|
| TPU | |
| 0 | 0 |
| 1 | 0.09 |
| 2 | 0.17 |
| 3 | 0.25 |
| 4 | 0.34 |
| 6 | 0.50 |
| 8 | 0.65 |
| 10 | 0.79 |
| TPU-LUC | |
| 0 | 0 |
| 1 | 0.10 |
| 2 | 0.19 |
| 3 | 0.29 |
| 4 | 0.37 |
| 6 | 0.54 |
| 8 | 0.68 |
| 10 | 0.83 |

TABLE 6

Tensile stress-strain data over the range 0%
to about 1600% strain for TPU and TPU-LUC.

| Strain (%) | Stress (MPa) |
|---|---|
| TPU | |
| 0 | 0 |
| 200 | 3.8 |
| 400 | 5.9 |
| 600 | 9.3 |
| 800 | 15.4 |
| 1000 | 25.7 |
| 1200 | 40.5 |
| 1295 | 25.1 |
| 1400 | 28.6 |
| 1476 | 31.3* |
| TPU-LUC | |
| 0 | 0 |
| 200 | 3.8 |
| 400 | 5.8 |
| 600 | 8.5 |
| 800 | 12.4 |
| 1000 | 17.2 |
| 1200 | 22.2 |
| 1295 | 50.3* |
| 1400 | N/A |
| 1476 | N/A |

N/A = Not applicable
*= Tensile stress at break

Comparative Example C

General

A segmented thermoplastic polyurethane nanocomposite containing organically modified montmorillonite, Cloisite 30B™ (Southern Clay Products (USA)) was prepared by a solvent casting technique. The average platelet dimension (ie largest dimension) of Cloisite 30B™ is approximately 100 nm, as measured by transmission electron microscopy (TEM). The resulting polymer composite comprising the Cloisite 30B™ particles was found to exhibit lower tensile strength compared to the polyurethane absent the Cloisite 30B™, and a higher Young's modulus (84% increase for a 3% w/w organosilicate loading).

Materials

The thermoplastic segmented polyurethane (TPU) employed consisted of a 1000 g/mol poly(tetramethylene oxide) (PTMO) soft segment with a 4,4'-methylene diphenyl diisocyanate (MDI) and 1,4-butanediol (BDO) hard segment. The hard segment concentration was 35% by weight, resulting in a soft elastomer of Shore Hardness 80 A. The TPU was supplied by Urethane Compounds, Australia. This material possessed the same composition and tensile properties as the TPU presented in example A.

Preparation

The organically-modified layered silicate used in this study was Cloisite 30B (30B) (Southern Clay Products). The Cloisite series of organosilicates are based on a natural montmorillonite with a cation exchange capacity of 0.92 meq/g. 30B has a 0.9 meq/g methyl bis-2-hydroxyethyltallow ammonium modification, and the tallow composition is ca. 65% C18, 30% C16, and 5% C14. 30B was dried in a vacuum oven at 80° C. for 12 h prior to use.

Solvent casting (SC). A 5 wt % solution of dried organosilicate in toluene was ultrasonicated at 20 kHz for 2 min before being added to a 5 wt % solution of TPU in dimethyl acetamide (DMAc). The combined solution was then mixed vigorously for 1 min in a high-shear homogeniser, followed by stirring for 1 h at room temperature with a magnetic stirrer. The mixture was then ultrasonicated for 2 min and films were immediately cast onto glass plates. The films were dried at 50° C. for 36 h under a nitrogen purge and subsequently for 12 h under vacuum. The solvent cast and melt compounded films were then annealed under vacuum at 80° C. for 12 h and left for 1 month prior to characterisation. Nanocomposites with organosilicate loadings of 3 wt % were prepared.

Characterisation

Transmission electron microscopy (TEM) was performed on the polymer composites. Samples of the composites were cut on a Leica Ultracut S ultramicrotome with a glass knife at −100° C. and collected on 400 mesh copper grids. Images were obtained using a JEOL JEM 1010 TEM operated at 100 keV.

Tensile and hysteresis tests were performed on the polymer samples at 25° C. on an Instron model 4505 universal testing machine using 5 replicates of each material. Dumbbells were punched from an ATSM D-638-M-3 die and strained at 50 mm/min. Young's modulus was calculated from the slope at 0% strain on the tensile curve.

Results

For convenience, the polymer composite comprising Cloisite 30B will hereinafter be referred to as TPU-30B (comparative example). A sample of the TPU comprising no Cloisite 30B will hereinafter be simply referred to as TPU (comparative example).

The particle size distribution of the dispersed particles in TPU-30B is believed to be similar to that reported by Fornes and Paul[1] in relation to a nylon/Cloisite 30B composite detailed in FIG. 8 on page 5000.

Data from the tensile curves produced from the TPU and TPU-30B samples are shown below in Tables 7 and 8. Table 7 shows a portion of the tensile stress-strain data over the range of 0% to 10% strain, and Table 8 shows tensile stress-strain data over the range of 0% to about 1600% strain. From Table 7 it can be seen that the tensile stress at a given percent strain for the TPU and TPU-30B samples are quite different, particularly at low strain. Data from this portion of the tensile curves may be used to evaluate the stiffness of the polymer samples. In particular, those skilled in the art will appreciate that the gradient of each curve derived from the data may be used as a measure of stiffness, with a higher gradient corresponding to a greater stiffness. Accordingly, the data in Table 7 is indicative of the TPU-30B polymer composite having a significantly higher stiffness to the TPU polymer.

From the data in Table 8, it can be seen that, for a given strain value, the TPU-30B polymer composite exhibits a significantly higher tensile stress than the TPU sample.

TABLE 7

Tensile stress-strain data over the range
0% to 10% strain for TPU and TPU-30B.

| Strain (%) | Stress (MPa) |
|---|---|
| TPU | |
| 0 | 0 |
| 1 | 0.07 |
| 2 | 0.15 |
| 3 | 0.22 |
| 4 | 0.30 |
| 6 | 0.44 |
| 8 | 0.58 |
| 10 | 0.72 |
| TPU-30B | |
| 0 | 0 |
| 1 | 0.13 |
| 2 | 0.28 |
| 3 | 0.40 |
| 4 | 0.52 |
| 6 | 0.72 |
| 8 | 0.89 |
| 10 | 1.05 |

TABLE 8

Tensile stress-strain data over the range 0%
to about 1600% strain for TPU and TPU-30B.

| Strain (%) | Stress (MPa) |
|---|---|
| TPU | |
| 0 | 0 |
| 200 | 4.2 |
| 400 | 6.7 |
| 600 | 10.8 |
| 800 | 17.9 |
| 1000 | 29.3 |
| 1096 | 36.9 |
| 1180 | 45.0* |
| TPU-30B | |
| 0 | 0 |
| 200 | 4.6 |
| 400 | 7.4 |
| 600 | 11.5 |
| 800 | 17.9 |
| 1000 | 27.2 |
| 1096 | 32.6* |
| 1180 | N/A |

N/A = Not applicable
*= Tensile stress at break

REFERENCES (1) Fornes, T. D.; Paul, D. R. *Polymer* 2003, 44, 4993-5013.
(2) Bergaya, Faiza; Lagaly, Gerhard *Applied Clay Science* 2001, 19, 1-3
(3) Fan, Xiaowu; Xia, Chuanjun; Advincula, Rigoberto, C. *Colloids and Surfaces A: Physiochem. Eng. Aspects* 2003, 219, 75-86
(4) Ray, Sudip; Bhowmick, Anil, K.; Sarma, K. S. S.; Majali, A. B.; Tikku, V. K. *Radiation Physics and Chemistry* 2002, 65, 627-640.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia or elsewhere.

Those skilled in the art will appreciate that the invention described herein is susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

The invention claimed is:

1. A polymer composite comprising a thermoplastic host polymer having solid particulate material dispersed therethrough, the host polymer having at least one phase nanodomain, wherein the solid particulate material comprises particles of which at least about 50 wt % have height, length and width dimensions which are all about 50 nanometers or less, wherein at least one of the dimensions of said at least about 50 wt % of the particles is substantially less than one or both of the other dimensions, and wherein the composite exhibits a higher tensile strength and an increase in modulus of no more than 10% relative to said host polymer.

2. The polymer composite according to claim 1, wherein the host polymer provides a soft continuous phase nanodomain and a hard discontinuous phase nanodomain.

3. The polymer composite according to claim 1, wherein the host polymer is selected from the group consisting of polyurethane, polyurea, polyurethaneurea, polyesteramide, polyetheramide, ethylene propylene random copolymer, polycaprolactone-etheramide, polyimide, polyurethane-imide, polyetherimide, polyetherester, polyesterurethane, poly(ethylene terephthalate)-poly(ethylene oxide), polydimethylsiloxane-containing segmented copolymers, copolyetheresteramides, copolyethylene trephthalateethylene oxide, and polyurethane-polydimethylsiloxane.

4. The polymer composite according to claim 1, wherein the host polymer is a thermoplastic segmented polyurethane.

5. The polymer composite according to claim 4, wherein the thermoplastic segmented polyurethane comprises a poly(tetramethyl ene oxide) soft segment and a 4,4'-methylene diphenyl diisocyanate/1,4-butane diol hard segment.

6. The polymer composite according to claim 1, wherein the solid particulate material is selected from the group consisting of metal oxide, carbon or boron nanotubes or fibres, layered silicate, and combinations thereof.

7. The polymer composite according to claim 6, wherein the layered silicate is naturally derived and selected from the group consisting of montmorillonite, saponite, hectorite, mica, vermiculite, bentonite, nontronite, beidellite, volkonskoite, magadite, kenyaite, and combinations thereof.

8. The polymer composite according to claim 6, wherein the layered silicate is synthetically derived and selected from the group consisting of synthetic mica, synthetic saponite, synthetic hectorite, synthetic magadite, synthetic kenyaite, and combinations thereof.

9. The polymer composite according to claim 7, wherein the layered silicate is modified with an ion-exchangeable or silane dispersing agent.

10. The polymer composite according to claim 1 which exhibits an increase in hysteresis of no more than about 40%, relative to the host polymer.

11. The polymer composite according to claim 1, wherein the solid particulate material is dispersed throughout the host polymer by a melt mixing process.

12. A polymer composite comprising a thermoplastic host polymer having solid particulate material dispersed therethrough, the host polymer having at least one phase nanodomain, wherein the solid particulate material comprises particles of which at least about 50% by number have height, length and width dimensions which are all about 50 nanometers or less, wherein at least one of the dimensions of said at least about 50% by number of the particles is substantially less than one or both of the other dimensions, and wherein the composite exhibits a higher tensile strength and an increase in modulus of no more than 10% relative to said host polymer.

13. The polymer composite according to claim 12, wherein the host polymer provides a soft continuous phase nanodomain and a hard discontinuous phase nanodomain.

14. The polymer composite according to claim 13, wherein the host polymer is selected from the group consisting of polyurethane, polyurea, polyurethaneurea, polyesteramide, polyetheramide, ethylene propylene random copolymer, polycaprolactone-etheramide, polyimide, polyurethane-imide, polyetherimide, polyetherester, polyesterurethane, poly(ethylene terephthalate)-poly(ethylene oxide), polydimethylsiloxane-containing segmented copolymers, copolyetheresteramides, copolyethylene trephthalate-ethylene oxide, and polyurethane-polydimethylsiloxane.

15. The polymer composite according to claim 12, wherein the host polymer is a thermoplastic segmented polyurethane.

16. The polymer composite according to claim 15, wherein the thermoplastic segmented polyurethane comprises a poly(tetramethyl ene oxide) soft segment and a 4,4'-methylene diphenyl diisocyanate/1,4-butane diol hard segment.

17. The polymer composite according to claim 12, wherein the solid particulate material is selected from the group consisting of metal oxide, carbon or boron nanotubes or fibres, layered silicate, and combinations thereof.

18. The polymer composite according to claim 17, wherein the layered silicate is naturally derived and selected from the group consisting of montmorillonite, saponite, hectorite, mica, vermiculite, bentonite, nontronite, beidellite, volkonskoite, magadite, kenyaite, and combinations thereof.

19. The polymer composite according to claim 17, wherein the layered silicate is synthetically derived and selected from the group consisting of synthetic mica, synthetic saponite, synthetic hectorite, synthetic magadite, synthetic kenyaite, and combinations thereof.

20. The polymer composite according to claim 18 wherein the layered silicate is modified with an ion-exchangeable or silane dispersing agent.

21. The polymer composite according to claim 12 which exhibits an increase in hysteresis of no more than about 40%, relative to the host polymer.

22. The polymer composite according to of claim 12, wherein the solid particulate material is dispersed throughout the host polymer by a melt mixing process.

23. The polymer composite according to claim 1 which comprises about 0.5 wt % to about 10 wt % of the solid particulate material.

24. An article of manufacture selected from the group consisting of biomedical products, textiles, wear linings, actuators, electrical devices, optical devices, and polaroid materials, wherein said article is manufactured at least in part from a polymer composite comprising a thermoplastic host polymer having solid particulate material dispersed therethrough, the host polymer having at least one phase nanodomain, wherein the solid particulate material comprises particles of which at least about 50 wt % have height, length and width dimensions which are all about 50 nanometers or less, wherein at least one of the dimensions of said at least about 50 wt % of the particles is substantially less than one or both of the other dimensions, and wherein the composite exhibits a higher tensile strength and an increase in modulus of no more than 10% relative to said host polymer.

25. The article according to claim 24, wherein the biomedical products are selected from the group consisting of artificial intervertebral discs (AID), breast implant shells, heart valves, heart pacemaker connectors, coatings, lead insulators and fixation devices, suture materials, vascular grafts and patches, endotracheal tubes, synthetic bile ducts, stents, catheters, electrodes for functional electrical stimulation, condoms, surgical gloves, blood bags and their closures and fittings, blood oxygenating tubing and cardiac-assist pump bladders and their associated tubing, housing and coatings.

26. The polymer composite according to claim 8, wherein the layered silicate is modified with an ion-exchangeable or silane dispersing agent.

27. The polymer composite according to claim 19, wherein the layered silicate is modified with an ion-exchangeable or silane dispersing agent.

28. The polymer composite according to claim 12 which comprises about 0.5 wt % to about 10 wt % of the solid particulate material.

29. An article of manufacture selected from the group consisting of biomedical products, textiles, wear linings, actuators, electrical devices, optical devices, and and polaroid materials, wherein said article is manufactured at least in part from a polymer composite comprising a thermoplastic host polymer having solid particulate material dispersed therethrough, the host polymer having at least one phase nanodomain, wherein the solid particulate material comprises particles of which at least about 50% by number have height, length and width dimensions which are all about 50 nanometers or less, wherein at least one of the dimensions of said at least about 50% by number of the particles is substantially less than one or both of the other dimensions, and wherein the composite exhibits a higher tensile strength and an increase in modulus of no more than 10% relative to said host polymer.

* * * * *

UNITED STATES PATENT AND TRADEMARK OFFICE
CERTIFICATE OF CORRECTION

| | |
|---|---|
| PATENT NO. | : 8,293,812 B2 |
| APPLICATION NO. | : 11/575750 |
| DATED | : October 23, 2012 |
| INVENTOR(S) | : Darren James Martin |

Page 1 of 1

It is certified that error appears in the above-identified patent and that said Letters Patent is hereby corrected as shown below:

Title Page,
    Item (73) Assignee:
    Delete "The University of Queensland of St. Lucia (AU)" and insert
    -- The University of Queensland (AU) --.

Signed and Sealed this
Twenty-first Day of May, 2013

Teresa Stanek Rea
*Acting Director of the United States Patent and Trademark Office*